US006513893B2

(12) United States Patent
Esaki et al.

(10) Patent No.: US 6,513,893 B2
(45) Date of Patent: Feb. 4, 2003

(54) HEAD DRIVE UNIT AND DRIVING METHOD

(75) Inventors: Takahiro Esaki, Fukuoka (JP); Naomi Shirai, Kasuga (JP); Hirokazu Ikeda, Fukuoka (JP); Toshihiro Asoh, Kurume (JP); Masaharu Oyama, Chikushino (JP); Takanobu Kajikawa, Tosu (JP); Kenichi Kimori, Tosu (JP); Michiteru Shichiro, Kasuga (JP)

(73) Assignee: Matsushita Electrc Industrial Co., Ltd., Kadoma (JP)

(*) Notice: Subject to any disclaimer, the term of this patent is extended or adjusted under 35 U.S.C. 154(b) by 0 days.

(21) Appl. No.: 09/977,236

(22) Filed: Oct. 16, 2001

(65) Prior Publication Data

US 2002/0048028 A1 Apr. 25, 2002

(30) Foreign Application Priority Data

Oct. 17, 2000 (JP) ....................................... 2000-316168
Oct. 17, 2000 (JP) ....................................... 2000-316169

(51) Int. Cl.[7] ............................ B41J 29/38; G05B 1/00; G06F 7/02

(52) U.S. Cl. ......................................... 347/9; 340/146.2

(58) Field of Search ............................ 347/9; 340/146.2

(56) References Cited

U.S. PATENT DOCUMENTS 6,102,510 A * 8/2000 Kikuta et al. .................. 347/9
6,231,154 B1 * 5/2001 Corrigan ...................... 347/17
6,270,180 B1 * 8/2001 Arakawa et al. .............. 347/14

* cited by examiner

*Primary Examiner*—John Barlow
*Assistant Examiner*—Alfred E. Dudding
(74) *Attorney, Agent, or Firm*—Wenderoth, Lind & Ponack, L.L.P.

(57) ABSTRACT

In a head drive unit of ink-jet recorder and the like, for the purpose of reducing amount of data for head driving waveform and data processing time, a time data at a point where an electric current changes and an electric current data are stored in time data storage means and electric current data storage means, and the time data is compared with a count data of an address counter. The electric current data is then output to drive a head, when the data matches as a result of the comparison.

14 Claims, 21 Drawing Sheets

HEAD DRIVE UNIT AND DRIVING METHOD

FIELD OF THE INVENTION

The present invention relates to a head drive unit for ink-jet recorder and the like, and a method of driving the same.

BACKGROUND OF THE INVENTION

In ink-jet recording, thermal method and piezoelectric method are the two methods now in use widely. Between these two, the piezoelectric method has a feature that is capable of controlling precisely amount of ink mist and an ejecting spot since it uses a piezoelectric element as an actuator to eject ink mist.

Referring now to the accompanying figures, driving waveforms for an ink-jet head of the piezoelectric method will be described hereinafter.

FIGS. 5A through 5C show head driving waveforms and injecting operation of ink mist. FIG. 5A is a diagrammatic illustration depicting an example of head driving wave as a voltage waveform, FIG. 5B is another diagrammatic illustration depicting the example of head driving wave as a current waveform, and FIG. 5C a diagrammatic illustration depicting changes of an actuator and a meniscus of a head, and appearance of ejected ink mist. Points of time at which driving waveform changes are represented as t1, t2, t3, t4, t5, t6, t7 and t8, voltage values that cause deformation of the actuator as Va, Vb, Vc and Vd, and current values that cause the deformation of the actuator as Ia, Ib, Ic and Id.

Because the actuator consisting of a piezoelectric element is a capacitive load, the waveform shown in FIG. 5B has such a relation to FIG. 5A in that the waveform of FIG. 5A is differentiated.

With reference to the current waveform, described hereinafter pertains to an example of how an ink-jet head is driven.

At the time 0, actuator 82 and meniscus 83 provided in one part 81 of the head are in a flat steady state 91. When the actuator 82 is charged with electric current 1b at the time t1, the actuator 82 begins to deform gradually in a direction of pushing out the meniscus 83. At the time t2, it deforms up to a state marked 92. After this state is maintained until the time t3, the actuator 82 is discharged by electric current Ic until the time t4, to cause the actuator 82 to pull the meniscus 83 back to a state marked 93. After this state is maintained until the time t5, the actuator 82 is charged rapidly by a larger electric current Id than the current Ib until the time t6, so as to cause the actuator 82 to push the meniscus 83 abruptly out to a state marked 94, and to make it eject ink mist 84. This state is held until the time t7 thereafter, and the meniscus 83 is gradually pulled back, and returned to the flat steady state 91 by discharging the actuator 82 by a smaller electric current la than the current Ic until the time t8.

One printing cycle (T) consisting of the above operations is repeated for a number of ties necessary to produce an image.

Described next pertains to the conventional head driving waveform generator circuit which performs the above operations.

FIG. 3 is an example of driving current waveform for the head actuator, as is shown in FIG. 5B. In this example, reference characters t1 through t8 represent the time at which the electric current changes, and numerical values within parentheses under them are time data representing the time (shown in hex number; all data will be shown hereinafter using the hexadecimal number system). Reference characters Ia, Ib, Ic, and Id represent values of the electric current, and numerical values in parentheses next to them are electric current data. Here, a direction in which the electric current flows toward the head actuator is given as positive, another direction where the current flows out of the head actuator as negative, and electric current data when its value is 0 is assigned to be 7F.

In FIG. 3, assuming that the printing cycle (T) is 25.6 microseconds, and time resolution is 0.1 microsecond, the driving current waveform for one printing cycle, when expressed in "electric current data/time data" is shown as follows. That is, 7F/00, 7F/01, 7F/02, . . . , 7F/20, A3/21, A3/22, . . . , A3/49, 7F/4A, . . . , 7F/57, 19/58, 19/60, 7F/61, . . . , 7F/6B, F4/6C, . . . , F4/70, 7F/71, . . . , 7F/86, 42/87, . . . , 42/9E, 7F/9F, . . . and 7F/FF. It becomes data of 256 Bytes.

Two examples of generating the above-described head driving current waveform will be described next. FIG. 6 is an example of block diagram of a head drive unit constructed with a memory.

In FIG. 6, a CPU (not shown in the figure), which controls a system of the ink-jet recorder, writes electric current data 16 in memory 121 using a time as an address, prior to initiating the head drive operation. Counter 1 repeats clearing operation and counting operation for every printing cycle according to the printing operation of the ink-jet recorder. Count data 11 is supplied to the memory 121 as an address, and the electric current data 16 is output from the memory 121. This electric current data 16 is converted into an analog value by DAC 7. An output of the DAC 7 is amplified by the amplifier circuit 8, supplied to head 9, and deforms the actuator 82. Deformation of the actuator causes ejection of ink mist.

Referring now to a block diagram of FIG. 7, another example of head drive unit constructed with a shift register is described.

In FIG. 7, a CPU (not shown in the figure), which controls a system of the ink-jet recorder, writes electric current data 16 for one printing cycle in time-sequential order into shift register 141, prior to initiating the head drive operation. The shift register 141 outputs the electric current data 16 in synchronization with clock according to the printing operation of the ink-jet recorder. A number of registers contained in the shift register 141 is equal to a number of the data for one printing cycle. In addition, since the output is fed back to input, it repeats outputting the head driving waveform in synchronism with the printing cycle.

Using FIG. 8 through FIG. 15, a process of generating the 256 Bytes of head driving current data is described next.

The ink-jet head receives a great influence of an ambient temperature, rise and fall in temperature of ink in particular, upon its performance of ejecting ink mist, i.e., ejecting amount and ejection velocity. It is therefore necessary to make correction of the head driving waveform according to the temperature, in order to maintain the ejecting performance for stable ink mist. The correction can be made in one case by varying only value of the electric current while keeping its timing unchanged, or in another case, by varying both timing and value of the electric current.

Referring to FIG. 8 through FIG. 10, described first pertains to the case of making correction by varying only the current value while not changing the timing. FIG. 8 shows an example of head driving waveforms (waveform 161 in solid line and waveform 162 in dotted line) at different temperatures. FIG. 9 shows an example of driving current value to temperature characteristic necessary to keep constant the ejecting performance of ink mist. Ink requires greater driving energy at lower temperature since its viscosity generally increases. Therefore, value of the electric current increases at low temperature, and decreases at high temperature. This temperature characteristic is non-linear relative to temperature. In a correction data table, 10 points or so of reference data are maintained in general as shown with dark dots in the figure in order to reduce an amount of the data. A value of electric current corresponding to any actual operating temperature is obtained by linear interpolation according to the reference data at both sides adjacent to that temperature.

A flow chart for this process is shown in FIG. 10. Upon start of making a data table for the head driving current, an environmental temperature (operating ambient temperature/ink temperature) is checked (S101), and a data table for reference head driving current is selected (S102). Afterwards, a data table for the head driving current is generated (by linear interpolation relative to the current value) according to the environmental temperature (S103), and generation of the data table for head driving current is completed.

Using FIG. 11 through FIG. 15, described here is the case of making correction by varying both timing and current value. Both the current value and the timing are varied as shown in FIG. 11, depicting an example of head driving waveforms under different temperatures (waveform 221 in solid line and waveform 222 in dotted line). FIG. 12 shows a given operating temperature 243 and reference temperatures 242 and 241 next to the temperature 243. It further shows that a difference in temperature between the operating temperature 243 and the reference temperature 242 is given as TEMP1, and another difference in temperature between the operating temperature 243 and the reference temperature 241 is given as TEMP2.

FIG. 13 is an enlarged illustration showing an encircled portion "A" in FIG. 11. With reference to FIG. 13, described now is a case in which a driving waveform for the given operating temperature is obtained from driving waveforms of the reference temperatures. Here, a difference in rise timing between waveform 262 at the reference temperature and waveform 263 at the operating temperature is given as T1, and another difference in rise timing between waveform 261 at the other reference temperature and the waveform 263 at the operating temperature is given as T2. Also, a difference in fall timing between the waveform 262 at the reference temperature and the waveform 263 at the operating temperature is given as T3, and another difference in fall timing between the waveform 261 at the other reference temperature and the waveform 263 at the operating temperature is given as T4. A difference in value of electric current between the waveforms 262 and 263 is given as I1, and another difference in value of electric current between the waveforms 261 and 263 is given as I2.

A relation between the timings and the electric current data in this case is expressed as T1:T2=T3:T4=I1:I2=TEMP1:TEMP2, and therefore the timing and value of current at the operating temperature 263 is obtainable with linear interpolation. The head driving waveform thus becomes one illustrated as 263 shown in FIG. 14. The driving current waveform takes an area composed of an area obtained for the timing by linear interpolation and another area obtained for the value of current by linear interpolation using the AND logic, as shown in FIG. 14. A flow chart for this process is shown in FIG. 15. First, an environmental temperature (operating ambient temperature/ink temperature) is checked (S151), and a reference head driving data table is selected (S152). Next, linear interpolation for the value of current (S153) and linear interpolation for the timing (S154) are performed, and their results are composed (S155).

The foregoing techniques of the prior art impose certain problems as described below. In the case of a head drive unit having a printing cycle (T) of 25.6 microseconds and a time resolution of 0.1 microsecond, for instance, it requires data-storage means for 256 Bytes of data, such as a memory, a shift register, and the like in order to store and to output driving current waveform data enough for one complete printing cycle. It also requires means to store 256 Bytes×10, or 2560 Bytes of data, as the reference data of ten points needed for the temperature correction. In addition, it needs a data processing time for the two reference temperatures and the present temperature, for a total amount of 256 Bytes×3, or 768 Bytes of data.

Furthermore, when the time resolution is increased by twofold to 0.05 microseconds to obtain the printing performance of high precision, the electric current data for one printing cycle amounts to 512 Bytes, the reference data for temperature correction amounts to 5120 Bytes, and the processing time becomes what is needed for 1536 Bytes of data. Hence, the reference data and the processing time increase in proportion to the resolution.

In other words, it is necessary for the conventional head drive unit to store and process a large amount of data for generation of the head driving waveform. It also has a problem that expands a scale of waveform-related generator circuit, and reduces the printing speed because both amount of the data and their processing time increase in proportion to resolution, when the resolution of waveform data for the head driving current is enhanced to achieve printing of high image resolution.

SUMMARY OF THE INVENTION

An object of the p resent invention is to overcoming the afore-said problems. A head drive unit for ink-jet recorder of this invention comprises:

(1) an address counter for counting reference clocks;

(2) time data storage means for storing a plurality of time data, each of the plurality of time data representing the time at a point when an electric current changes;

(3) electric current data storage means for storing a plurality of electric current data corresponding to the plurality of time data respectively;

(4) a plurality of comparators for comparing each of the plurality of time data with address count data of the address counter, each of the plurality of comparators outputs a matching signal when each of the plurality of time data matches with the address count data; and (5) output means for storing and outputting, upon the matching signal is output, an electric current data corresponding to a time data compared by one of the comparators that outputs the matching signal, wherein the head drive unit drives a head based on the electric current data output by the output means.

A method of driving a head of the ink-jet recorder of this invention comprises the steps of:

(a) comparing a time for head driving operation with each of a plurality of time data at points where electric current changes in a head driving waveform; and (b) outputting an electric current data corresponding to a time data in match wit h the time for head driving operation, among the plurality of time data, when the time for head driving operation matches with any of the plurality of time data, thereby driving the head based on the electric current data output in the step (b).

DESCRIPTION OF THE PREFERRED EMBODIMENT

A first exemplary embodiment of the present invention will be described hereinafter with reference to FIG. 1 through FIG. 4.

Figure 4:
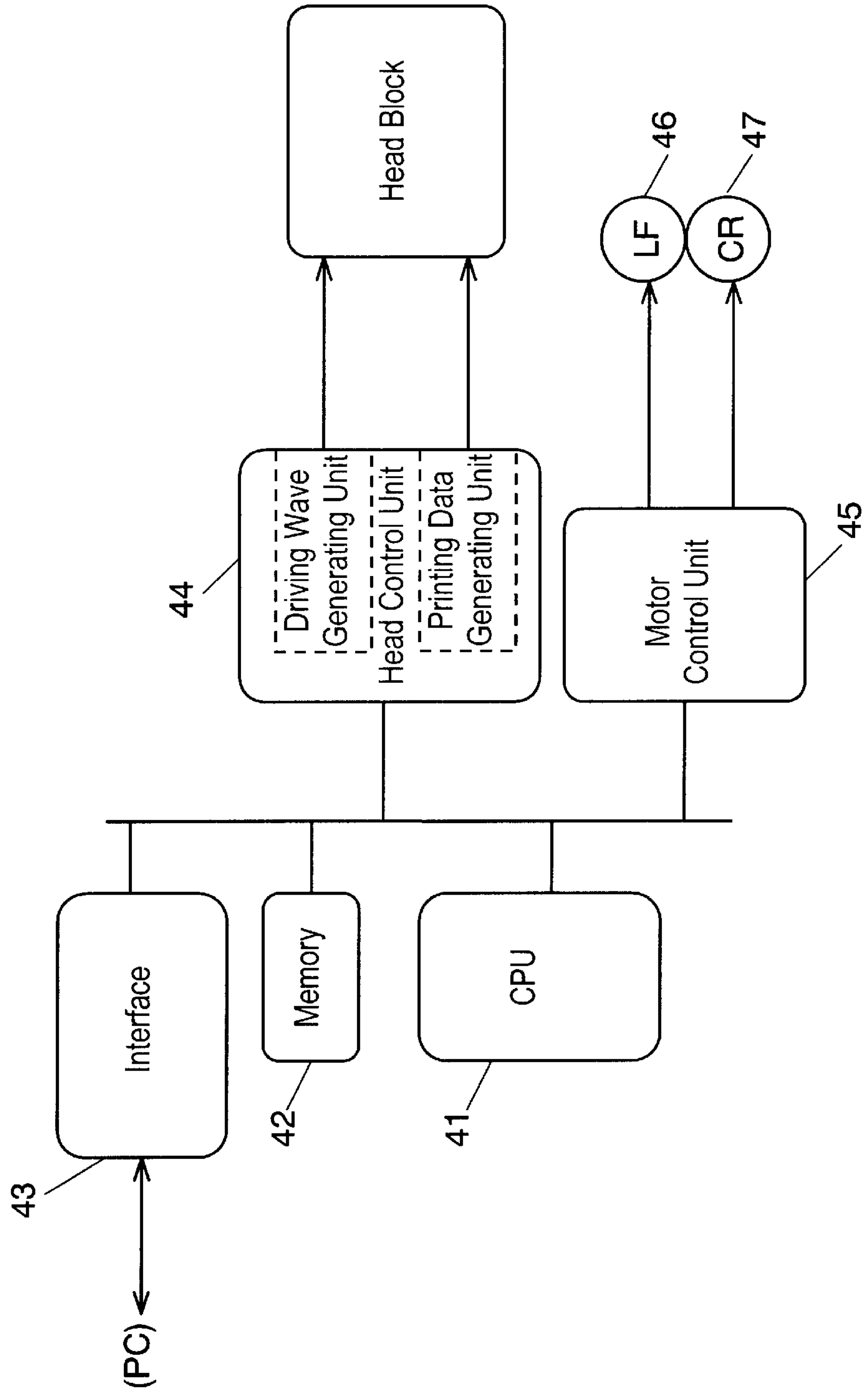
FIG. 4 is a block diagram showing a general structure of an inkaet recorder equipped with the head drive unit of the first exemplary embodiment of this invention.
Figure 5A:
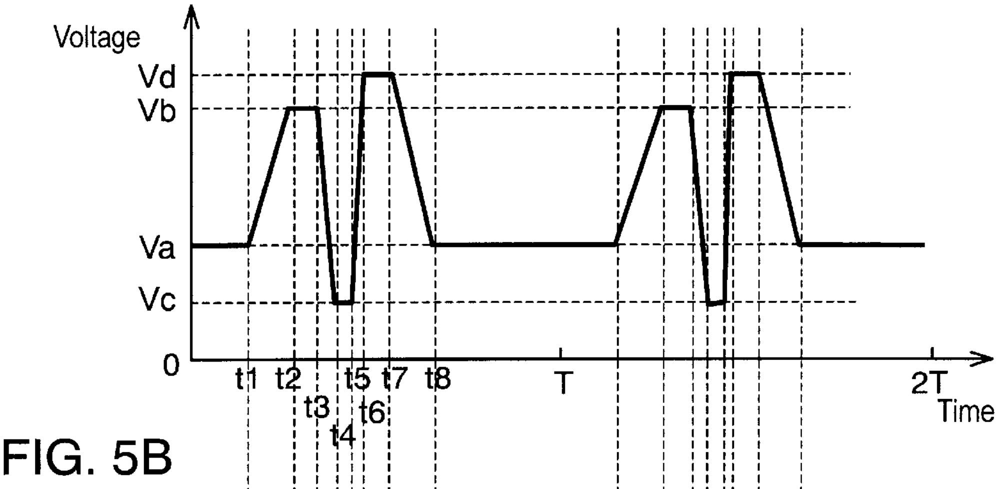
FIG. 5A is a diagrammatic illustration depicting an example of head driving wave as a voltage waveform.
Figure 5B:
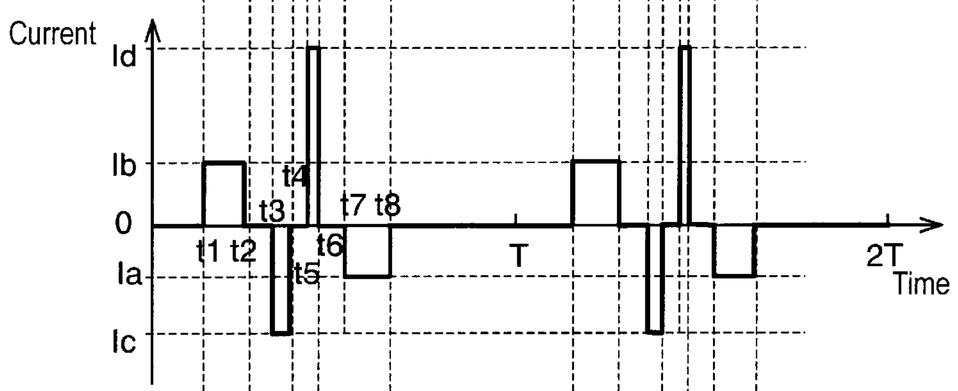
FIG. 5B is another diagrammatic illustration depicting the example of head driving wave as a current waveform.
Figure 5C:
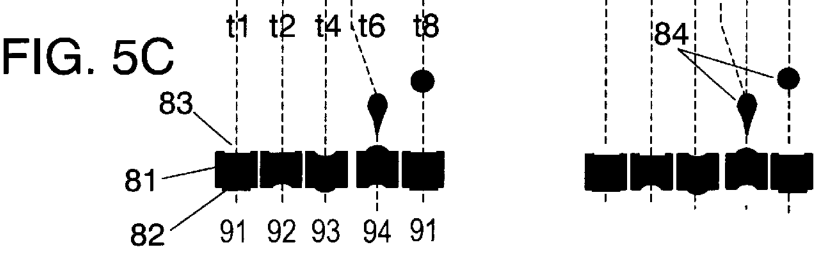
FIG. 5C is a diagrammatic illustration depicting changes of an actuator and a meniscus of a head, and appearance of ejected ink mist.
Figure 6:
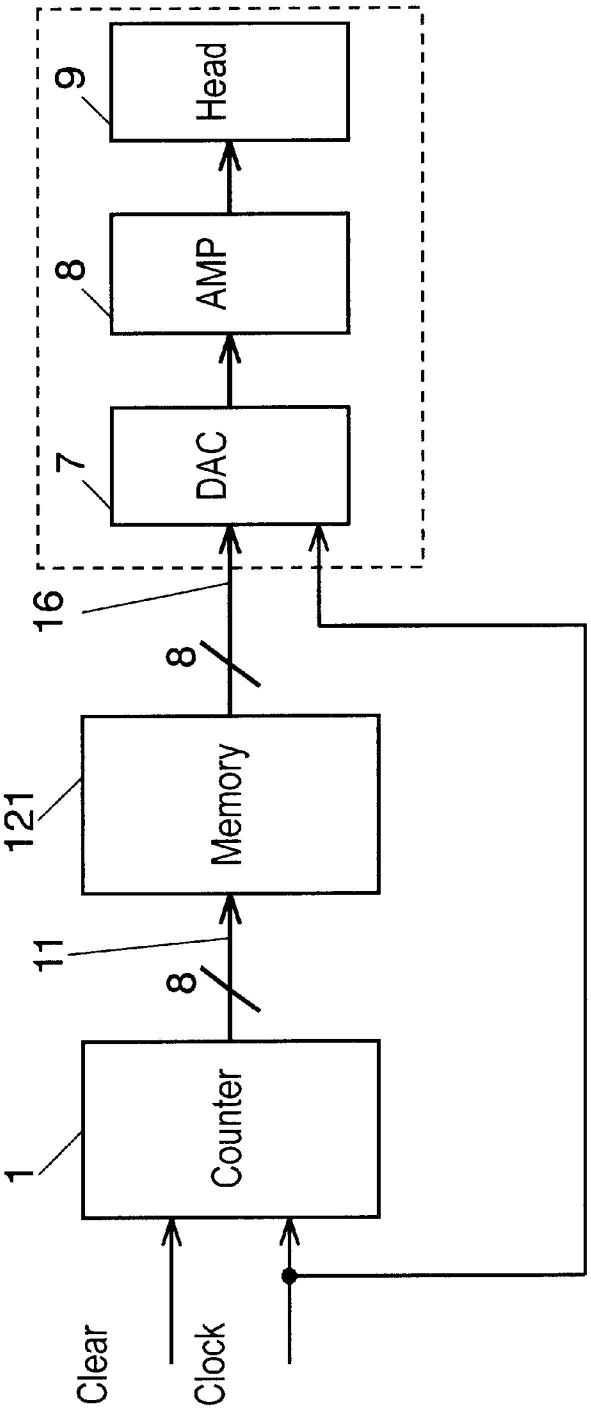
FIG. 6 is a block diagram of the conventional head drive unit constructed with a memory.
Figure 7:
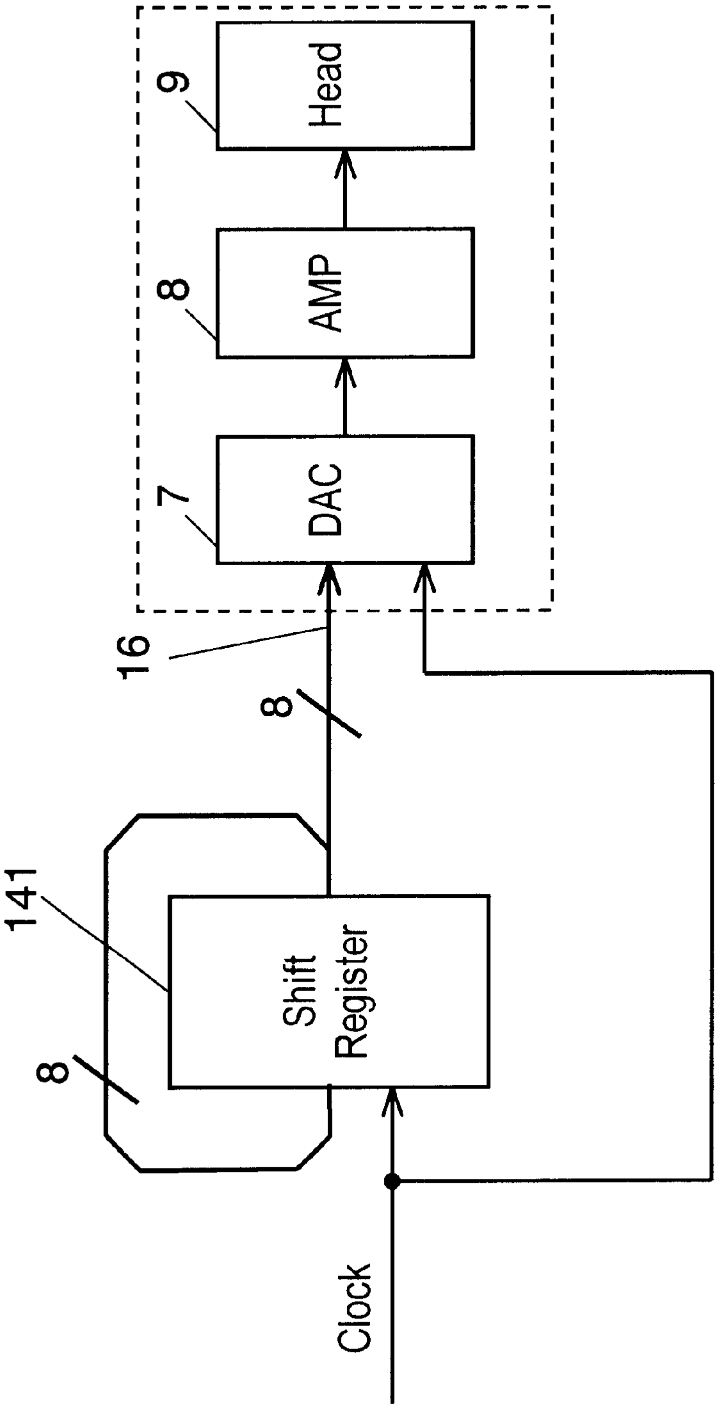
FIG. 7 is a block diagram of the conventional head drive unit constructed with a shift register.
Figure 8:
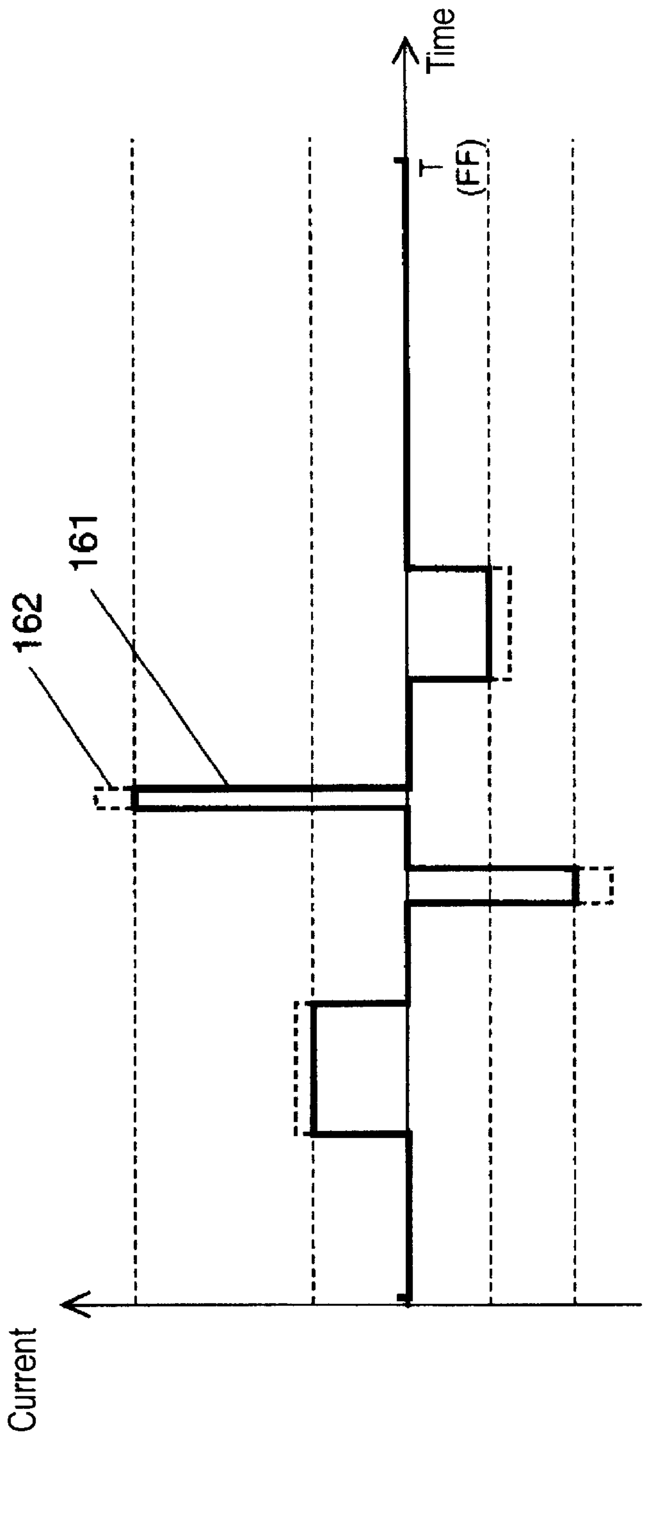
FIG. 8 is an illustration depicting a head driving current waveform used for making correction in the conventional manner by varying only value of the electric current while keeping its timing unchanged.
Figure 9:
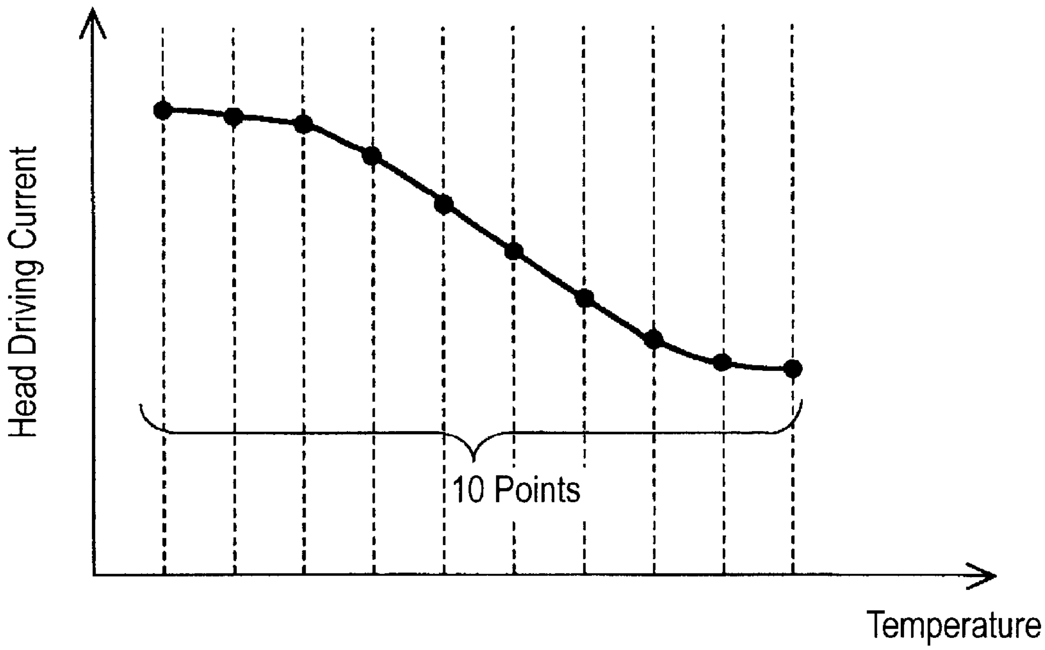
FIG. 9 is a graph showing an example of temperature characteristic of the conventional head driving current.
Figure 10:
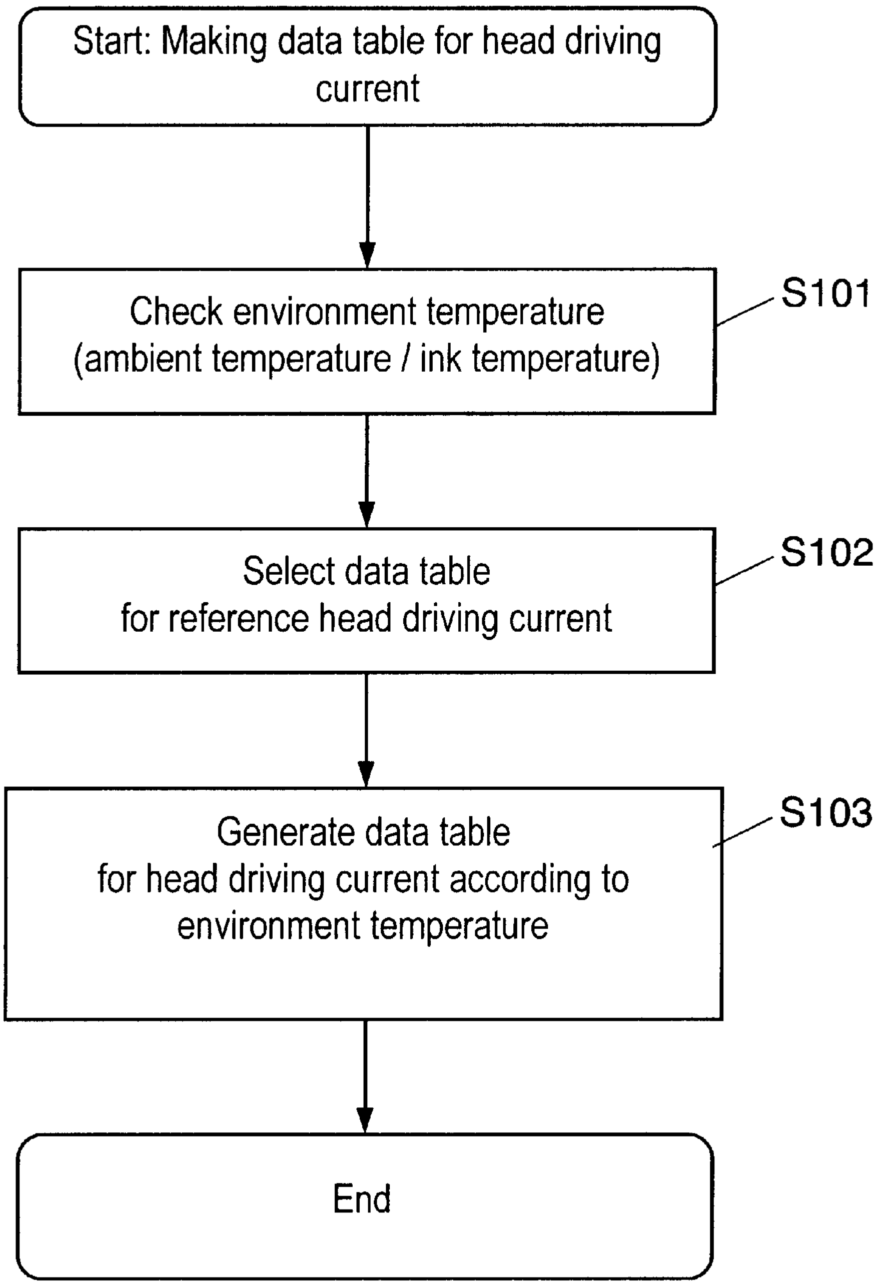
FIG. 10 is a flow chart for processing in the conventional head drive unit.
Figure 11:
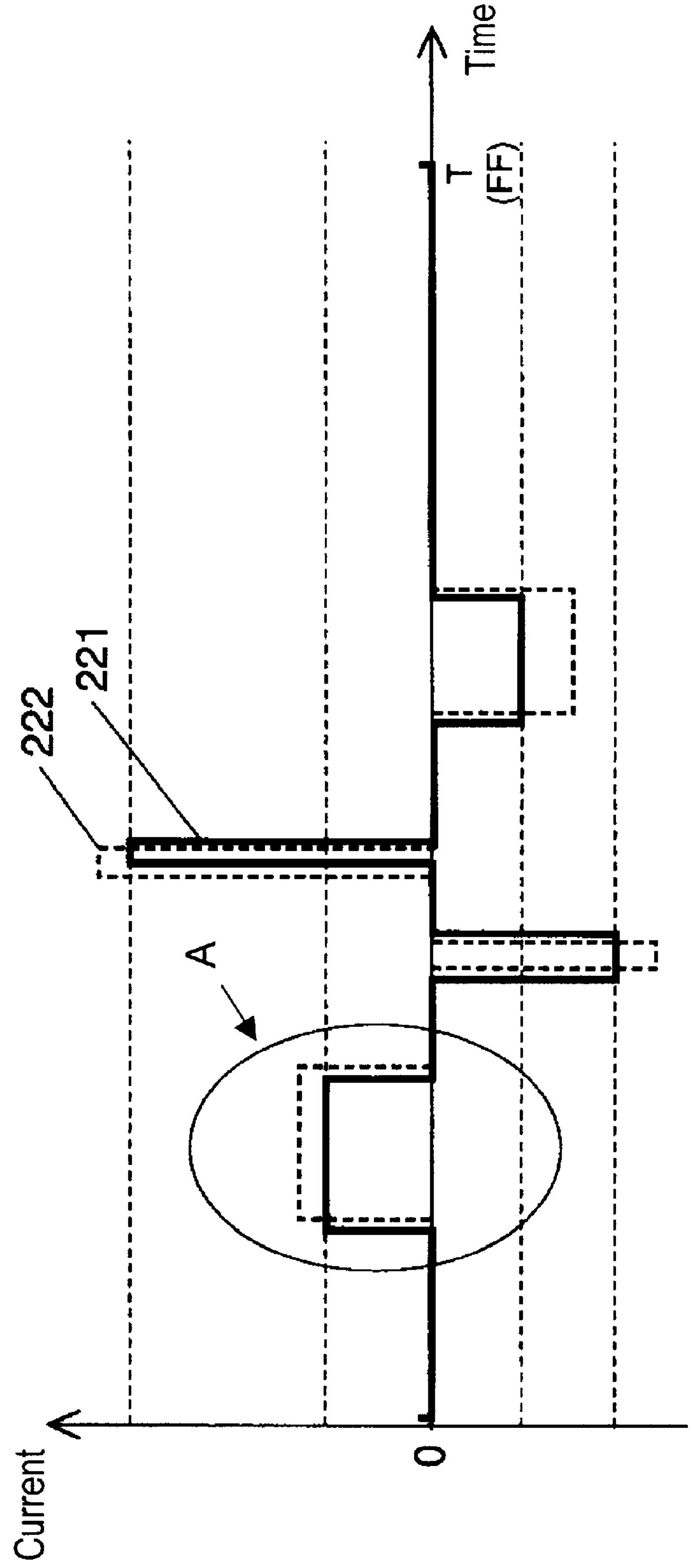
FIG. 11 is an illustration depicting a head driving current waveform used for making correction in the conventional manner by varying both timing and value of the electric current.
Figure 12:
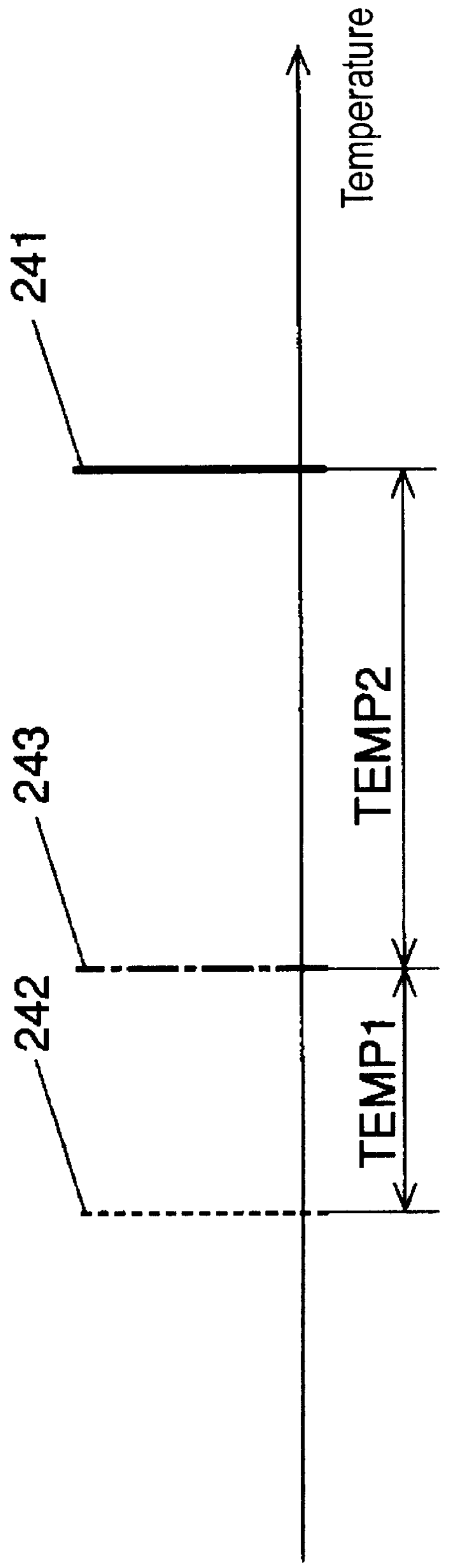
FIG. 12 is a diagrammatic illustration depicting a relation between operating temperature and reference temperatures of the conventional head drive unit.
Figure 13:
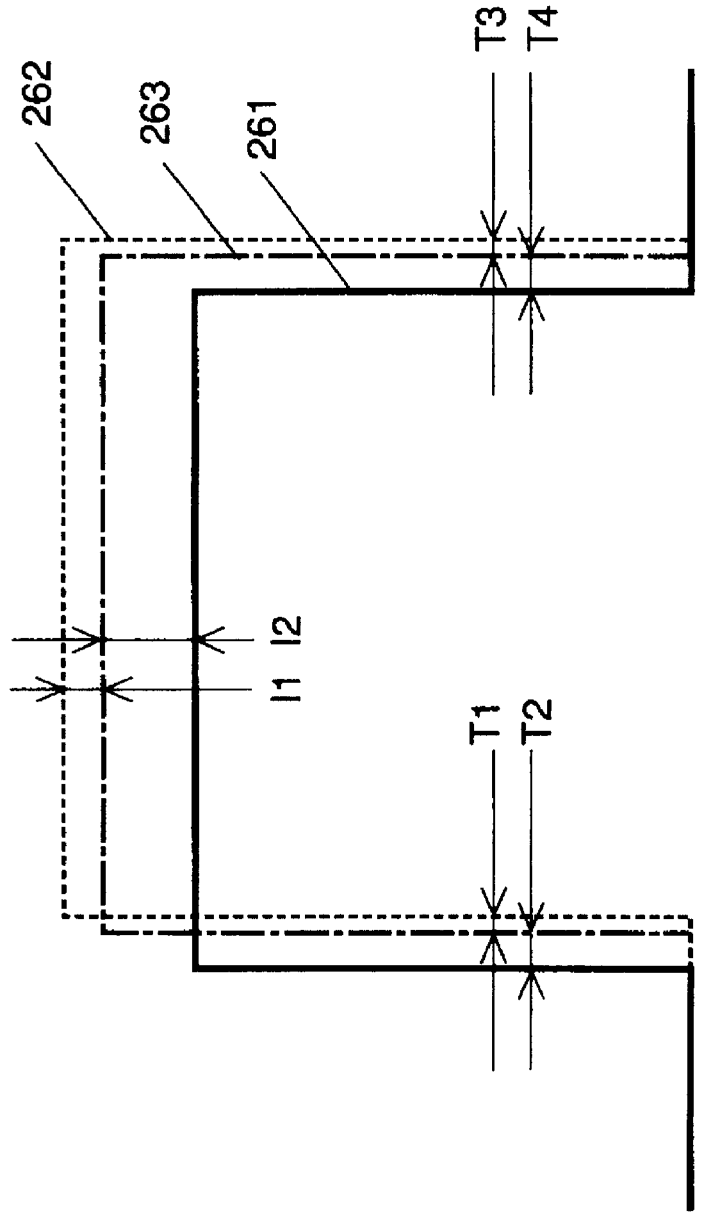
FIG. 13 is an enlarged illustration showing a part of the head driving current waveform depicted in FIG. 11.
Figure 14:
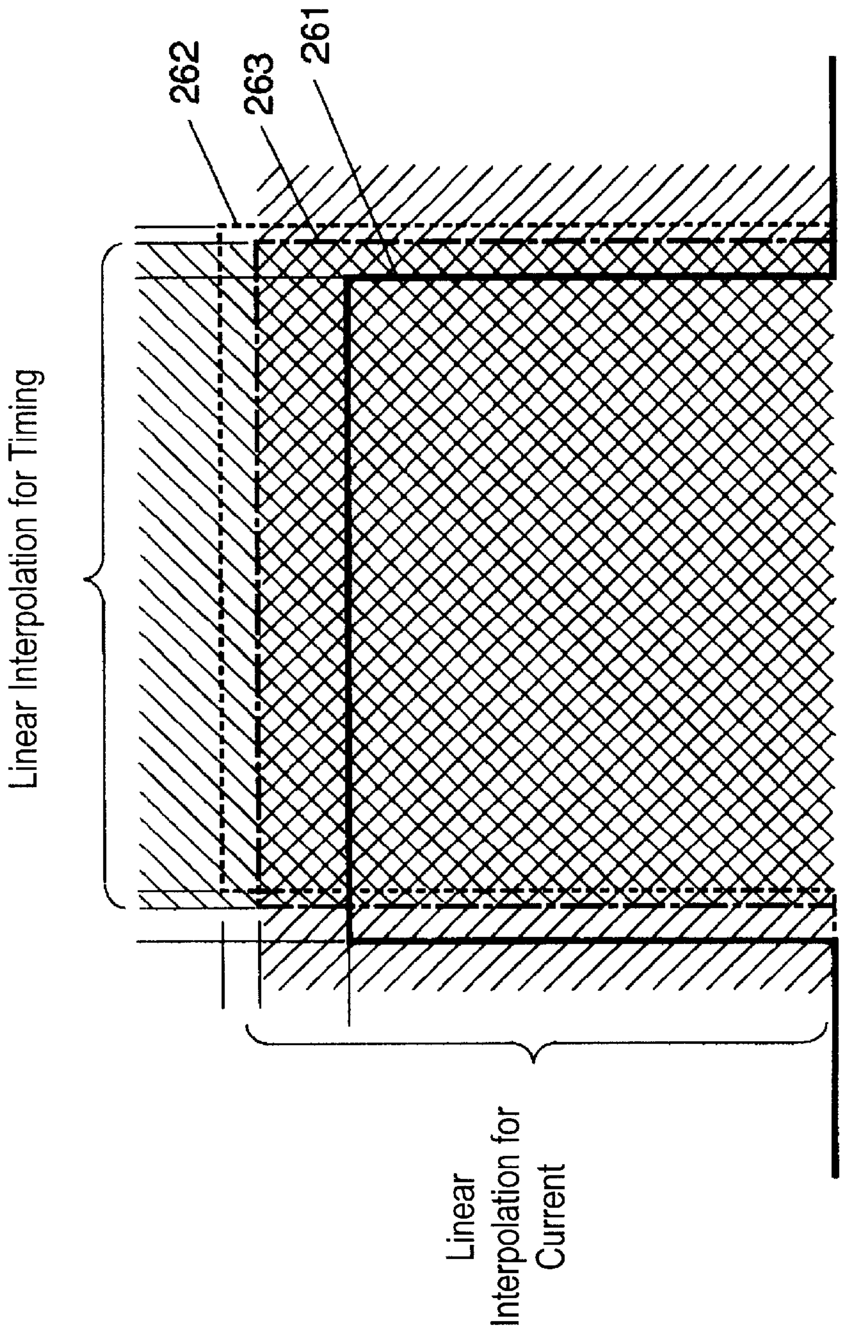
FIG. 14 is a diagrammatic illustration showing the conventional linear interpolation of the timing and the electric current value.
Figure 15:
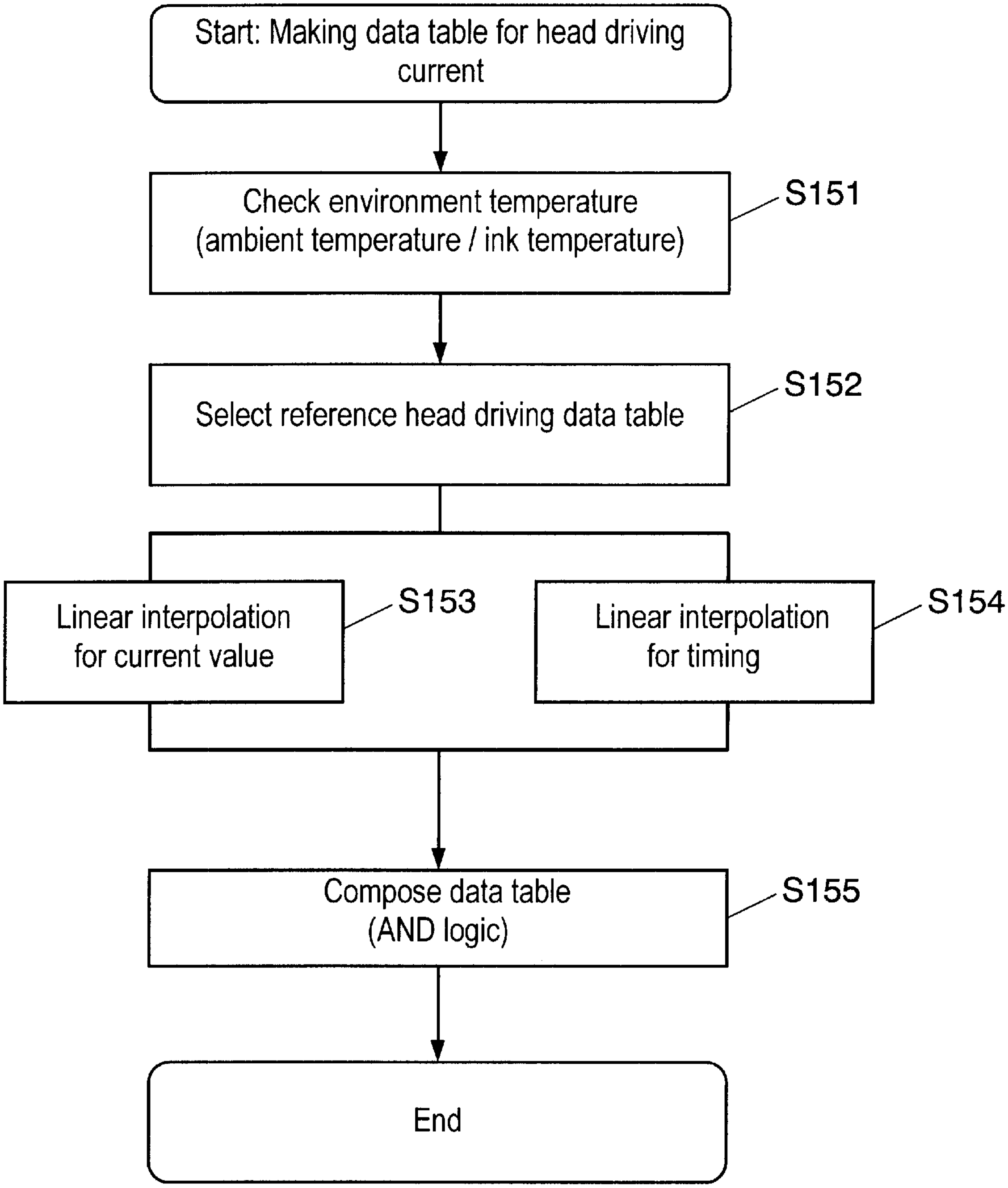
FIG. 15 is a flow chart for processing in the conventional head drive unit.

FIG. 4 is a block diagram showing a general structure of an ink-jet recorder equipped with a head drive unit of this first exemplary embodiment of the invention.

The ink-jet recorder shown in FIG. 4 comprises CPU 41 for controlling a system of the entire device, memory 42 for storing system program and data, interface unit 43 for controlling communication between an ink-jet recorder and such equipment as a personal computer and the like, a head control unit 44 for administering generation of a head driving waveform and head printing data, and motor control unit 45 for controlling rotation of paper transfer motor 46 and carriage motor 47.

Detail will be given hereinafter with respect to generation of a head driving waveform within the head control unit 44 of FIG. 4.

Figure 3:
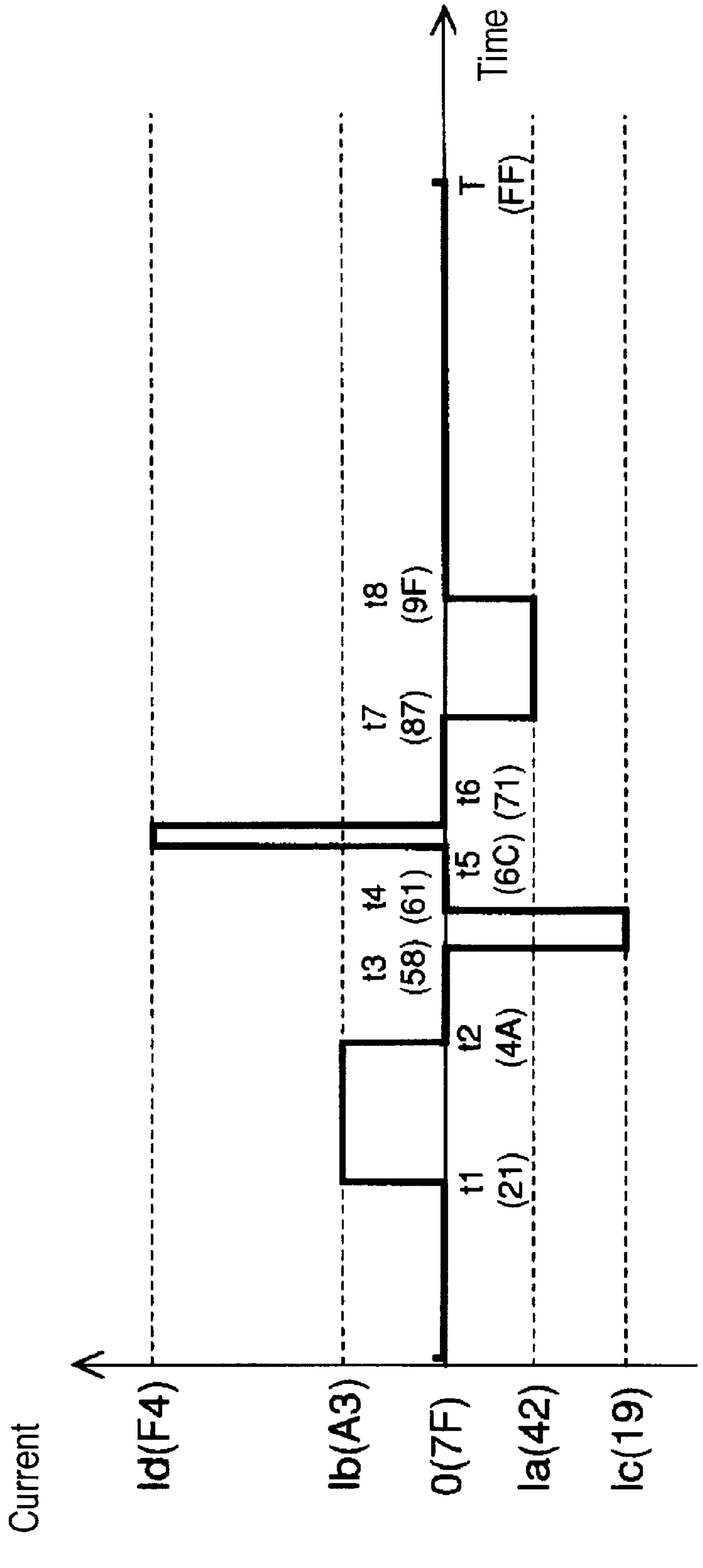
FIG. 3 is a diagrammatic illustration depicting an example of a head driving current waveform according to the first exemplary embodiment of this invention.

Described first is a case of generating a head driving waveform in an instance where there are points of change of the electric current at time t1, t2, . . . t8, as shown in FIG. 3.

Figure 1:
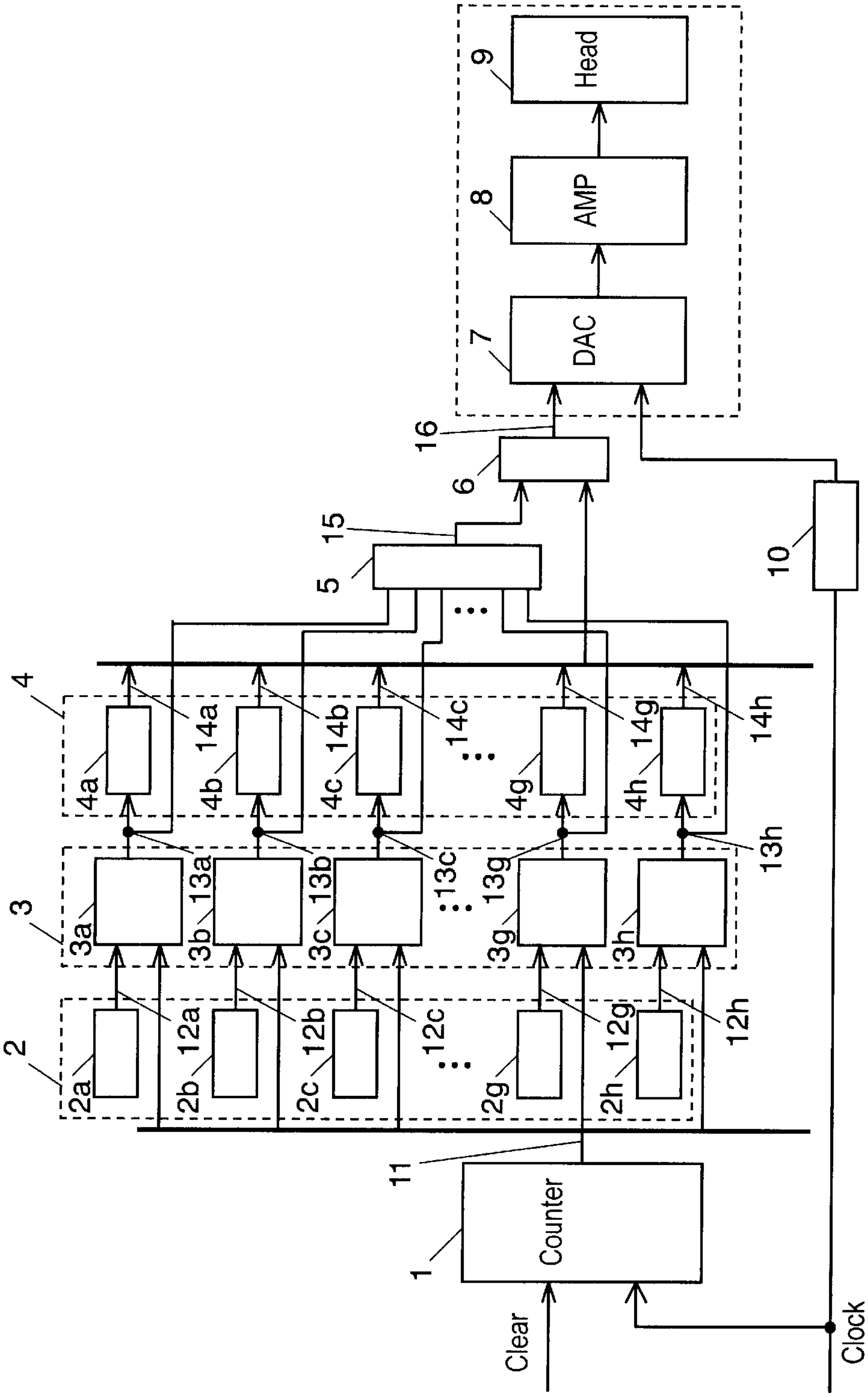
FIG. 1 is a block diagram of a head drive unit according to a first exemplary embodiment of the present invention.
Figure 2:
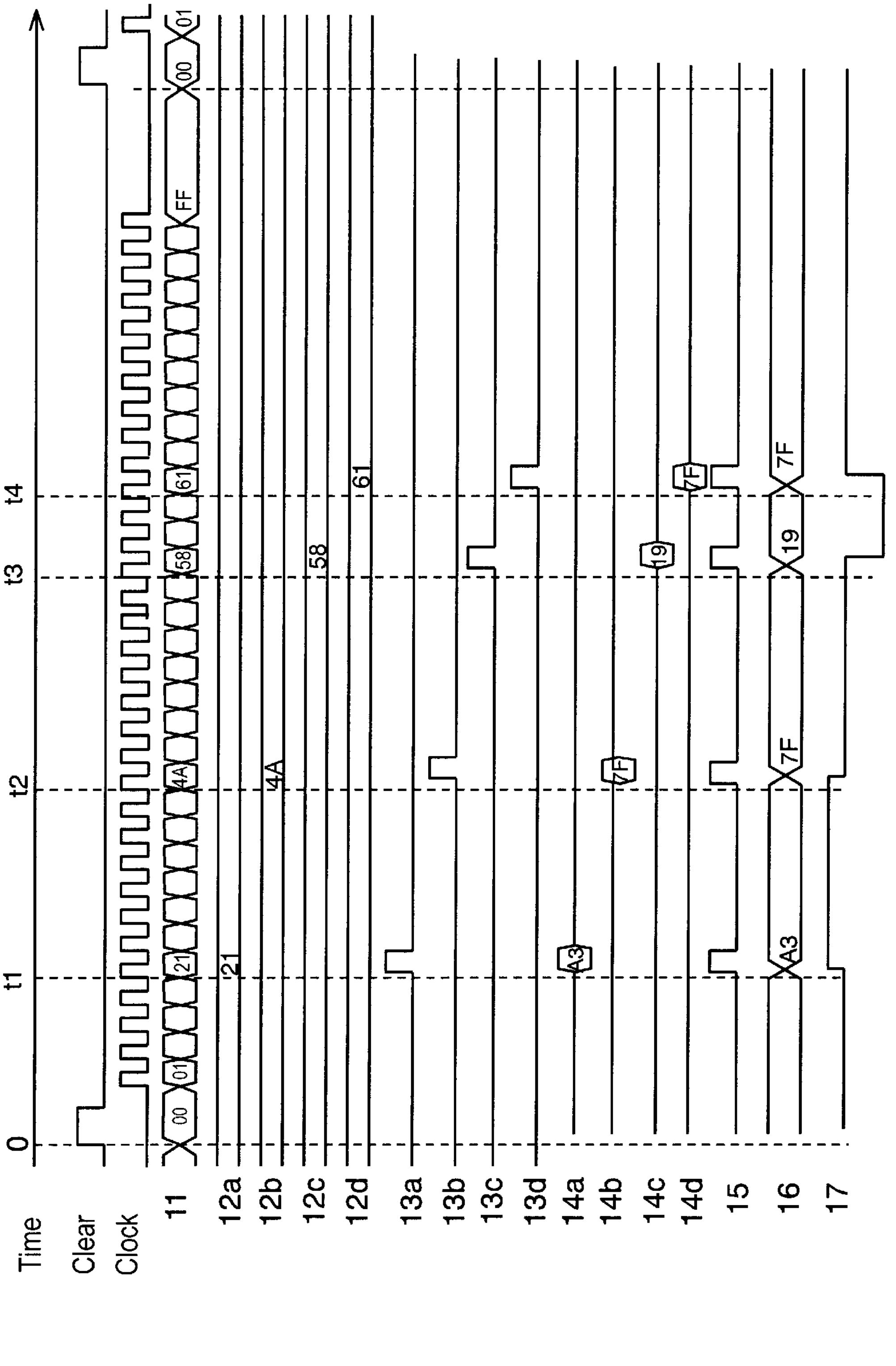
FIG. 2 is a timing chart showing an operation in epitome of the head drive unit of the first exemplary embodiment of this invention.

Counter 1 shown in FIG. 1 counts clock signals, and count data 11 is cleared by a clear signal. Upon an initializing operation as will be described later, a plurality of time data 12*a* through 12*h* at points of change in electric current of the head driving waveform are written by control means such as the CPU 41, and stored in a plurality of time data registers 2 (consisting of eight registers 2*a* through 2*h*). The stored time data 12*a*–12*h* are input to a plurality of comparators 3 (consisting of eight comparators 3*a* through 3*h*), and they are constantly compared with the count data 11 of the counter 1, i.e., an elapsed time (the present time) after the previous count data was cleared. Each of output signals 13*a* through 13*h* of the comparators 3 is judged "false" if each of the time data 12*a* though 12*h* does not match with the count data 11, or judged "true" if matches.

Each of current data registers 4 (4*a* through 4*h*) stores respective one of a plurality of electric current data 14*a* through 14*h* at the points of change in electric current of the head driving waveform, upon the initializing operation as will be described later.

Each of the current data registers 4*a* through 4*h* makes a triad with respective ones of the time data registers 2*a* through 2*h* and the comparators 3*a* through 3*h*. Signals 13*a* through 13*h* of the comparators 3 are input to the current data registers 4*a* through 4*h* respectively.

Each of the current data registers 4 does not output the electric current data if the output signal of the corresponding comparator is "false", and it outputs the stored electric current data to latch 6 if the output signal is "true".

The output signals 13*a* through 13*h* are input to OR logic circuit 5, and the OR logic circuit 5 outputs OR logical output 15 to the latch 6. The latch 6 stores the electric current data when the OR logical output 15 is "true", and outputs it. The output of the latch 6 is converted into an analog value by DAC 7. An output of the DAC 7 is amplified by amplifier circuit 8, and supplied to head 9 to deform an actuator. Ink mist is ejected by deformation of the actuator. Delay circuit 10 is provided for adjustment of timing with respect to the DAC 7, the amplifier circuit 8 and the head 9 in the latter stages. Waveform generator circuit in the head drive unit of the first exemplary embodiment shown in FIG. 1 operates in a manner as depicted in a timing chart shown in FIG. 2.

First, the CPU 41, which controls the system of ink-jet recorder, lets the time data registers store time data for all the points of change of the driving current as a part of the initializing operation, prior to initiating a printing operation, i.e., a head driving operation. For instance, it lets the time data register 2*a* store a value "21" corresponding to time t1, as time data 12*a*. When this is defined as (t1, 21, 12*a*)→2*a*, the others are defined in the same way as (t2, 4A, 12*b*)→2*b*, (t3, 58, 12*c*)→2*c*, (t4, 61, 12*d*)→2*d*, (t5, 6C, 12*e*)→2*e*, (t6, 71, 12*f*)→2*f*, (t7, 87, 12*g*)→2*g*, and (t8, 9F, 12*h*) <2*h*.

Furthermore, the CPU 41 lets the current data registers store electric current data for all the points of change of the driving current in the same manner. For instance, it lets the current data register 4*a* store a value "A3" at the time t1, as electric current data 14*a*. When this is recorded as (t1: A3, 14*a*)→4*a*, the others are recorded in the same way as (t2: 7F, 14*b*)→4*b*, (t3: 19, 14*c*)→4*c*, (t4: 7F, 14*d*)→4*d*, (t5: F4, 14*e*)→4*e*, (t6: 7F, 14*f*)→4*f*, (t7: 42, 14*g*)→4*g*, and (t8: 7F, 14*h*)→4*h*.

In addition, the CPU 41 writes electric current data of a value "0" ("7F" in this instance) in the latch 6, and completes the initializing operation. Next, a clear signal is input to the counter 1 at the start of printing cycle, that is, when time t=0, so as to clear the count data 11. A counting operation begins thereafter when a clock serving as a timing reference for the head driving waveform is input. At this point of time, latch output (electric current data) 16 takes "7F". When the time reaches t1, the count data 11 becomes "21" which becomes equal to the time data 12*a*, which is "21", of the time data register 2*a*. This caused the comparator 3*a* to turn its output signal 13*a* into "true", thereby resulting in an output of electric current data 14*a*, i.e. "A3", stored in the current data register 4*a*. At the same time, the signal 13*a* is delivered to the latch 6 via the OR logic circuit 5, and the latch 6 stores and outputs the electric current data A3. Details of the DAC 7 and the latter stages are skipped, as they have been described previously.

When another clock is input after the time t1, value of the count data 11 becomes "22". Because it is not equal to any of the time data, all signals 13*a* through 13*h* are judged "false". In this case, none of the electric current data is output from the current data registers 4. However, the latch 6 continues to output the electric current data it has latched previously, because it does not receive output 15 of the OR logic circuit.

The above operations are repeated thereafter to generate head driving waveform for a complete printing cycle.

With the architecture as described above for generating the waveform with time data and data of the current values at the points of change, this exemplary embodiment only requires 16 Bytes to cover the time data and the electric current data, as compared to 256 Bytes needed by the conventional technique for storing and outputting the driving current waveform data for one printing cycle, in the case that the printing cycle is 25.6 microseconds and time resolution is 0.1 microsecond. When the temperature correction is carried out at 10 points, the reference data amount to a mere 160 Bytes, or 1/16 as compared to the 2560 Bytes needed by the prior technique.

Moreover, an overall data processing time is reduced, since time to process these data are naturally shortened to 1/16, in proportion to the amount of data, and thereby attaining a speedup of the ink-jet recorder.

Furthermore, it requires only 800 Bytes even if it stores all data for temperature correction performed in the resolution of 19C within a range of 0 to 50° C. Therefore, all of the data can be stored as they are, without processing the data through calculation from the reference data using the method of linear interpolation and the like. If this is the case, the time to process the data becomes unnecessary, and transfer of the data is all that is required.

In addition, the control logic can be simplified because of the architecture in that only one time data 12*a* is stored in one time data register 2*a*, and provided with the comparator 3*a* corresponding to it and the current data register 4*a* for storing the electric current data 14*a* corresponding to the time data 12*a*.

Also, a shape of wave between individual times corresponding to the points of change (e.g., between the time t1 and the time t2 in FIG. 3) becomes straight. This makes it unnecessary to provide the amplifier circuit having a special characteristic in the latter stage, but the circuit structure can be simplified by using only an amplifier circuit of good linearity.

In the foregoing first exemplary embodiment, although the head driving current has been described as having 8 points of change, there is no limitation in number of the points.

Figure 16:
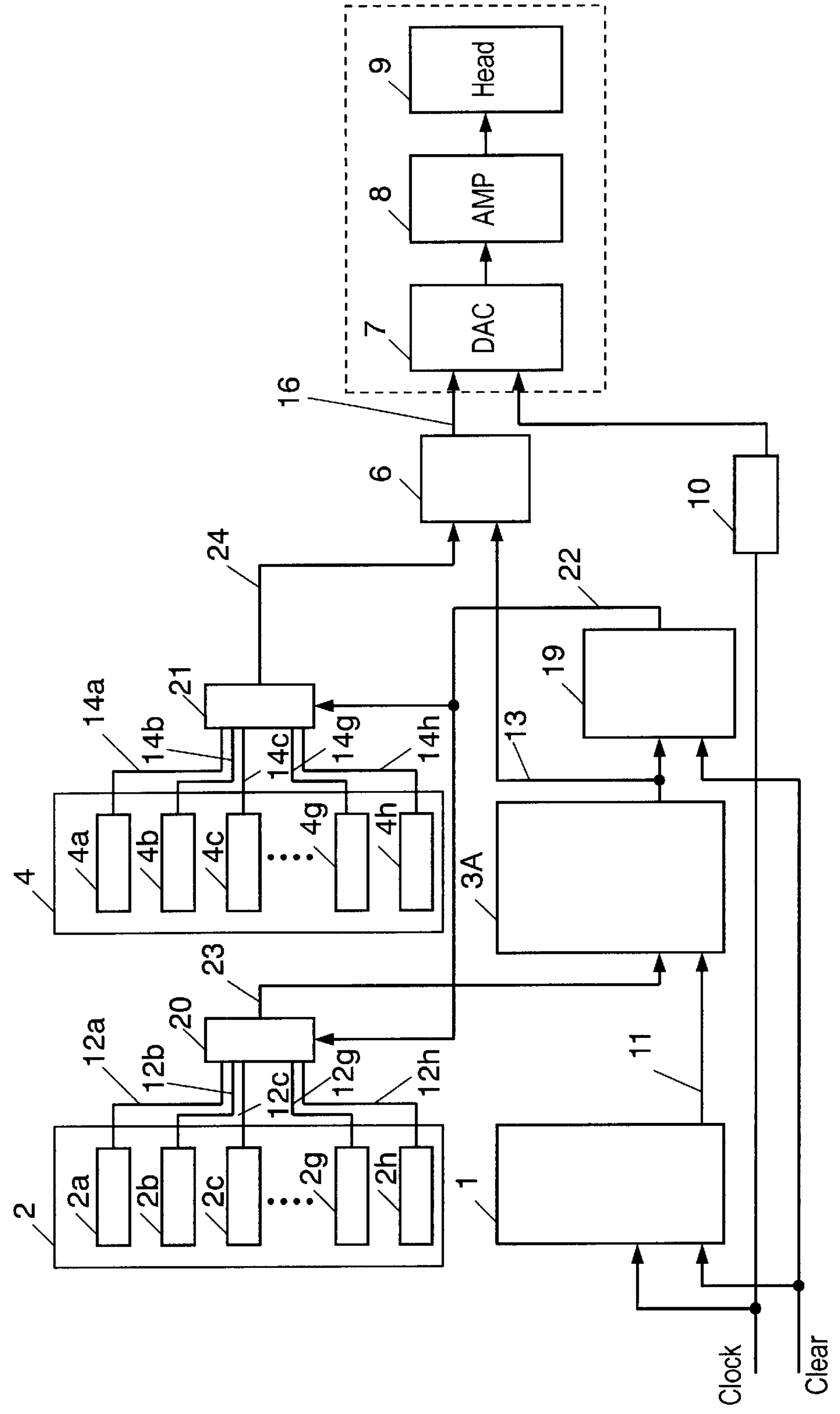
FIG. 16 is a block diagram of a head drive unit according to a second exemplary embodiment of this invention.
Figure 17:
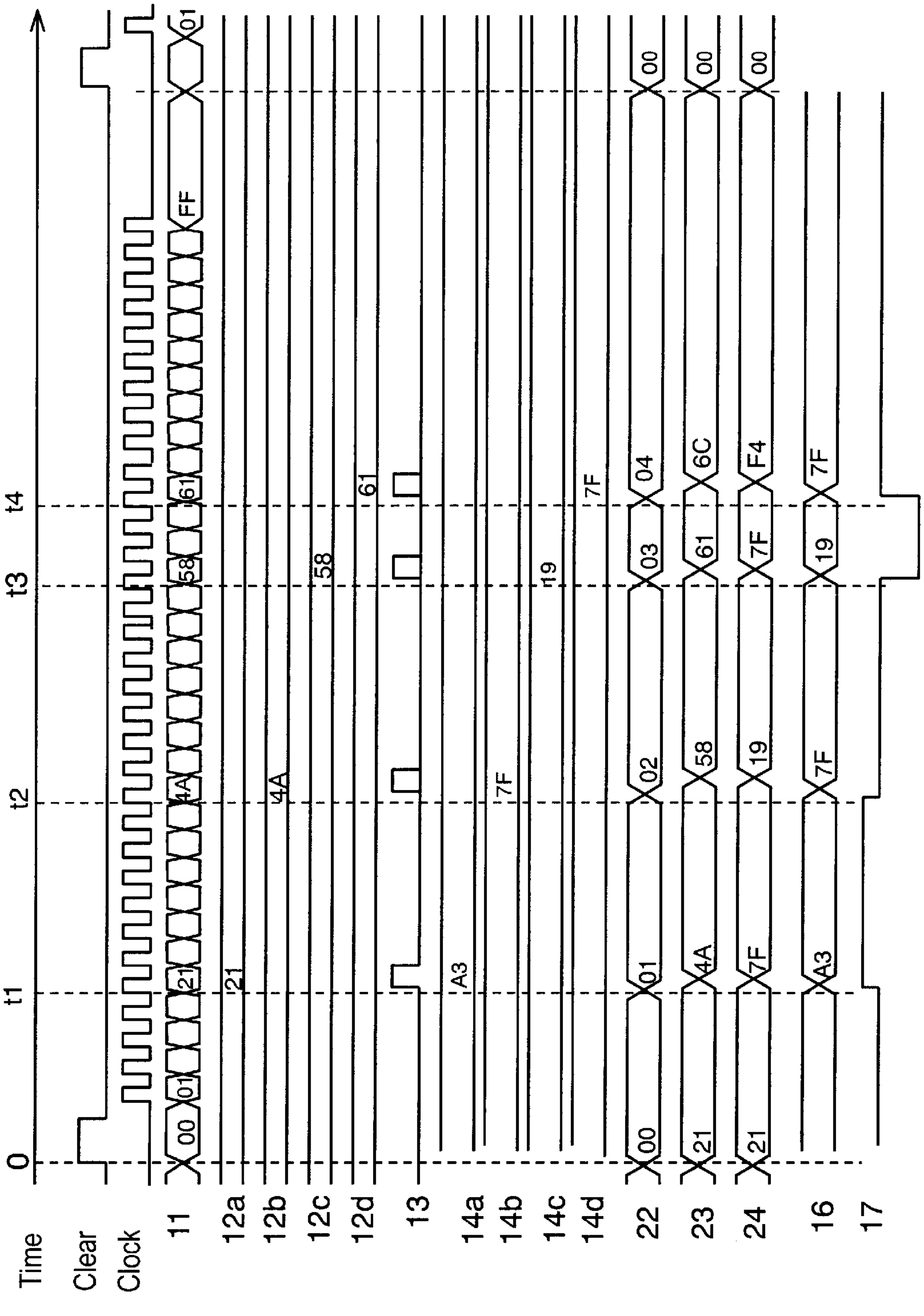
FIG. 17 is a timing chart showing an operation in epitome of the head drive unit of the second exemplary embodiment of this invention.

Referring now to FIGS. 16 and 17, a second exemplary embodiment of this invention is described.

FIG. 16 is a block diagram of a head drive unit according to the second exemplary embodiment of this invention, and in particular, it shows generation of waveform in detail. FIG. 17 is a timing chart showing an operation in epitome of the head drive unit of this second exemplary embodiment of the invention. Address counter 1 counts reference clock signals, and delivers address count data 11 to one of input terminals of comparator 3A. The address count data 11 of the counter 1 is cleared by a clear signal.

A plurality of time data 12*a* through 12*h* at points of change in electric current of head driving waveform are written in advance by control means such as CPU 41, and stored in time data registers 2 (consisting of registers 2*a* through 2*h*). The time data 12*a* through 12*h* are input in time-sequential order to the other input terminal of the comparator 3A via time data selector 20.

Each of current data registers 4 (4*a* through 4*h*) is paired with respective one of the time data registers 2. The control means such as the CPU 41 writes each of electric current data 14*a* through 14*h* at the points of change in electric current of the head driving waveform in advance into respective one of the current data registers 4. The time data 12*a* through 12*h* in the time data registers 2 and paired with the electric current data are input in time-sequential order to a data input terminal of latch 6 through current data selector 21.

Output 23 of the time data selector is compared at all times with address count data 11 (i.e., elapsed time (the present time) after cleared) of the address counter 1 by the comparator 3A. Output signal 13 from the comparator 3A is judged "true" if the address count data 11 matches with the output 23 of the time data selector, or judged "false" if it does not match.

The output signal 13 is input to a clock input terminal of change-point counter 19 as well as a latch signal input terminal of the latch 6.

The change-point counter 19 counts the signals 13. Change-point count data 22 is linked to selector terminals of the time data selector 20 and the current data selector 21, and it is cleared by the clear signal. The latch 6 supplies a latched output of the current data selector to DAC 7 in the latter stage.

Delay circuit 10 is provided for adjustment of timing with respect to the DAC 7, the amplifier circuit 8 and head 9 in the latter stages (details are omitted as have been described above).

In FIG. 16 and FIG. 17, first, the CPU 41, which controls the system of ink-jet recorder, stores time data for all the points of change of the driving current into the time data registers, as a part of an initializing operation prior to starting a printing operation, i.e., a head driving operation. For instance, it lets the time data register 2*a* (this corresponds to address "00" in the time data selector 20) store a value "21" corresponding to time t1, as time data 12*a*. When this is defined as (t1, 21, 12*a*)→2*a* (00), the others are defined in the same way as (t2, 4A, 12*b*)→2*b* (01), (t3, 58, 12*c*)→2*c* (02), (t4, 61, 12*d*)→2*d* (03), (t5, 6C, 12*e*)→2*e* (04), (t6, 71, 12*f*)→2*f* (05), (t7, 87, 12*g*)→2*g* (06), and (t8, 9F, 12*h*)→2*h* (07).

Furthermore, the CPU 41 lets the current data registers store electric current data for all the points of change of the driving current in the same manner. For instance, it lets the current data register 4*a* (this corresponds to address "00" in the current data selector 21) store a value "A3" at the time t1, as electric current data 14*a*. When this is recorded as (t1: A3, 14*a*)→4*a* (00), the others are recorded in the same way as (t2: 7F, 14*b*)→4*b* (01), (t3: 19, 14*c*)→4*c* (02), (t4: 7F, 14*d*)→4*d* (03), (t5: F4, 14*e*)→4*e* (04), (t6: 7F, 14*f*)→4*f* (05), (t7: 42, 14*g*)→4*g* (06), and (t8: 7F, 14*h*)→4*h* (07).

In addition, the CPU 41 writes electric current data of a value "0" ("7F" in this instance) in the latch 6, and it completes the initializing operation.

Next, at the beginning of printing cycle, or when the time t=0, a clear signal is input to the address counter 1 and the change-point counter 19, and the address count data 11 and the change-point count data 22 are cleared. A clock serving as a timing reference for the head driving waveform is input thereafter, and the address counter 1 starts a counting operation. At this point of time, latch output (electric current data) 16 carries "7F", and time data selector output 23 carries the data "21" stored in the time data register 2*a*, and current data selector output 24 carries the data "A3" stored in the current data register 4*a*.

When the time reaches t1, the address count data 11 becomes "21" which is equal to the time data selector output 23, or the data "21". This caused the comparator 3*a* to turn its output signal 13 into "true", and the current data selector output 24, or the data "A3", is stored in the latch 6 and it is output. At the same time, the change point counter 19 counts up, to make the time data selector output 23 change to data "4A" stored in the time data register 2*b*, and the current data selector output 24 change to data "7F" stored in the current data register 4*b*. After the time data selector output 23 changes to the data "4A", matching signal 13 of the comparator 3A becomes "false". Details of the DAC 7 and the latter stages are skipped, as they have been described previously.

The above operations are repeated thereafter at the time t2, t3, t4 and so on, to generate head driving waveform for a complete printing cycle.

As described above, this second exemplary embodiment is especially useful for such a case as generating a complicated head driving waveform with a large number of change points, since it requires only one comparator, regardless of a number of change points as compared to the first exemplary embodiment.

Any comparator that compares relative magnitude can also accomplish the same function as the comparator for comparing true or false of the matching.

In addition, a block composed of the time data registers, the time data selector, the address counter, and the comparator may be replaced by any other structure in that values in the time data registers are loaded into a counter for counting down, and the counter outputs a borrow (underflow) signal, so as to use the borrow signal in place of the matching signal of the comparator.

The architectures in the first and the second exemplary embodiments have been illustrated as using the current data registers in number corresponding to the number of change points. However, since many of current data at points of change in the electric current often take identical value, capacity of current data registers can be reduced by providing only a number of registers necessary for the possible number of variations that can take place, and by assigning the current data registers with unique codes that identify the registers individually for their electric current data.

Take an example, in which there are 20 points of change in electric current data, 5 sets of possible value among the electric current data, and 3 bits of register capacity for each code to identify which of the register for the value of the electric current data. Although the above exemplary embodiments require 8 bits×20 points, or 160 bits in total register capacity, this example using the electric current codes takes 3 bits×20 points +8 bits×5, i.e., 100 bits, and thereby it can reduce the register capacity substantially.

A third exemplary embodiment of this invention will be described next by referring to FIG. 18 through FIG. 21.

Figure 18:
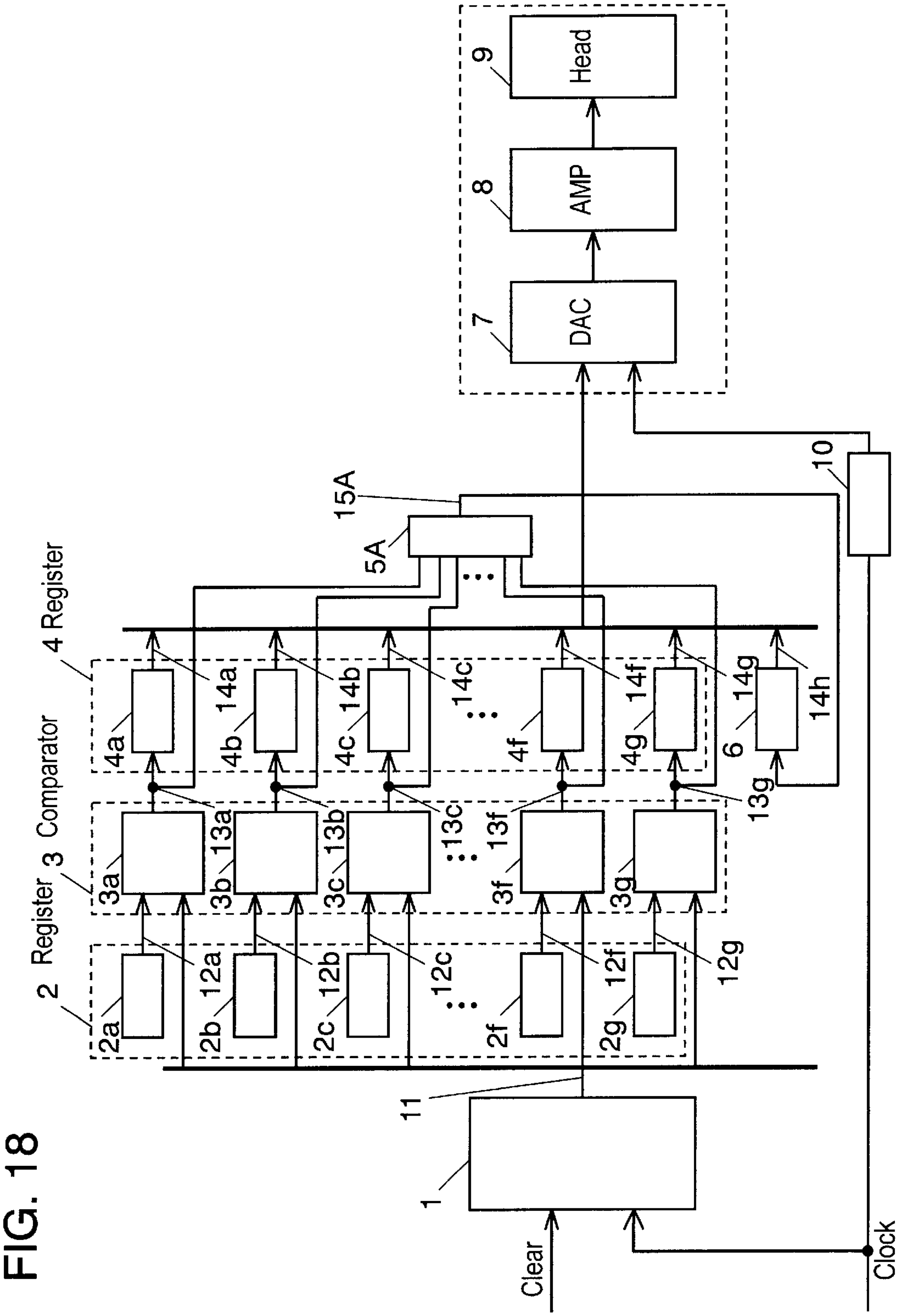
FIG. 18 is a block diagram of a head drive unit according to a third exemplary embodiment of this invention.
Figure 20:
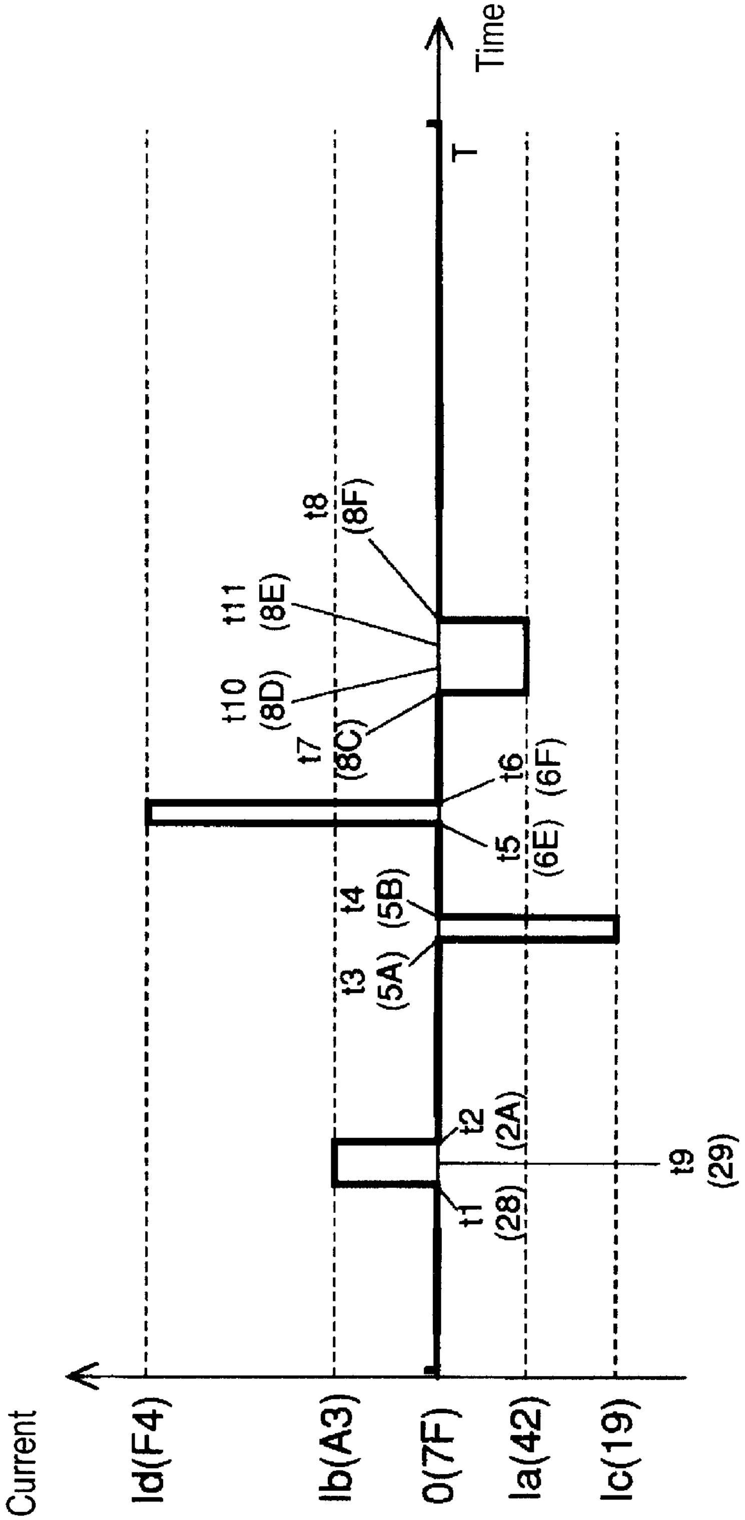
FIG. 20 is a diagrammatic illustration showing an example of head driving current waveform in the third exemplary embodiment of this invention.

Described first relates to a case of generating a head driving waveform shown in FIG. 20 with a circuit represented by a block diagram of FIG. 18.

In FIG. 18, counter 1 counts clock signals, and count data 11 is cleared by a clear signal. Time data 12*a* through 12*g*, except those when a value of head driving current is "0", are written in advance by control means such as CPU 41 into time data register 2 consisting of seven registers 2*a* through 2*g* respectively, and they are stored. The time data 12*a* through 12*g* are input to comparator 3 (seven comparators 3*a* through 3*g*) respectively. The time data 12*a* through 12*g* are compared by the comparators 3 with the count data 11 of the counter 1, i.e., an elapsed time (the present time) after the previous data was cleared. Each output of the comparators 3 is judged "false" when the input time data does not match with the count data 11, or judged "true" when it matches.

Each of the current data register 4 (4*a* through 4*g*), which stores the current data 14*a* through 14*g*, except when a value of the head driving current is "0", makes a triad with respective ones of the time data registers 2 and the comparators 3. Output signals 13*a* through 13*g* of the comparators 3 are input to the registers 4*a* through 4*g* respectively through their terminals that control their outputs. The current data registers 4 do not output the stored electric current data when the output signal of the corresponding comparator is judged "false", and they output the stored electric current data if the output signal is "true".

NOR logic circuit 5A receives signals 13$a$ through 13$g$ as an input, and it outputs NOR logical output 15A to "0" current data register 6. The NOR logical output 15A becomes "true" when all of the output signals 13$a$ through 13$g$ are "false", and it becomes "false" if otherwise.

The register 6 outputs "0" current data 14$h$ when the NOR logical output 15A becomes "true". Delay circuit 10 is a circuit provided for adjustment of timing with respect to DAC 7, amplifier circuit 8, and head 9 in the latter stage (details are omitted as they have been described previously).

Figure 19:
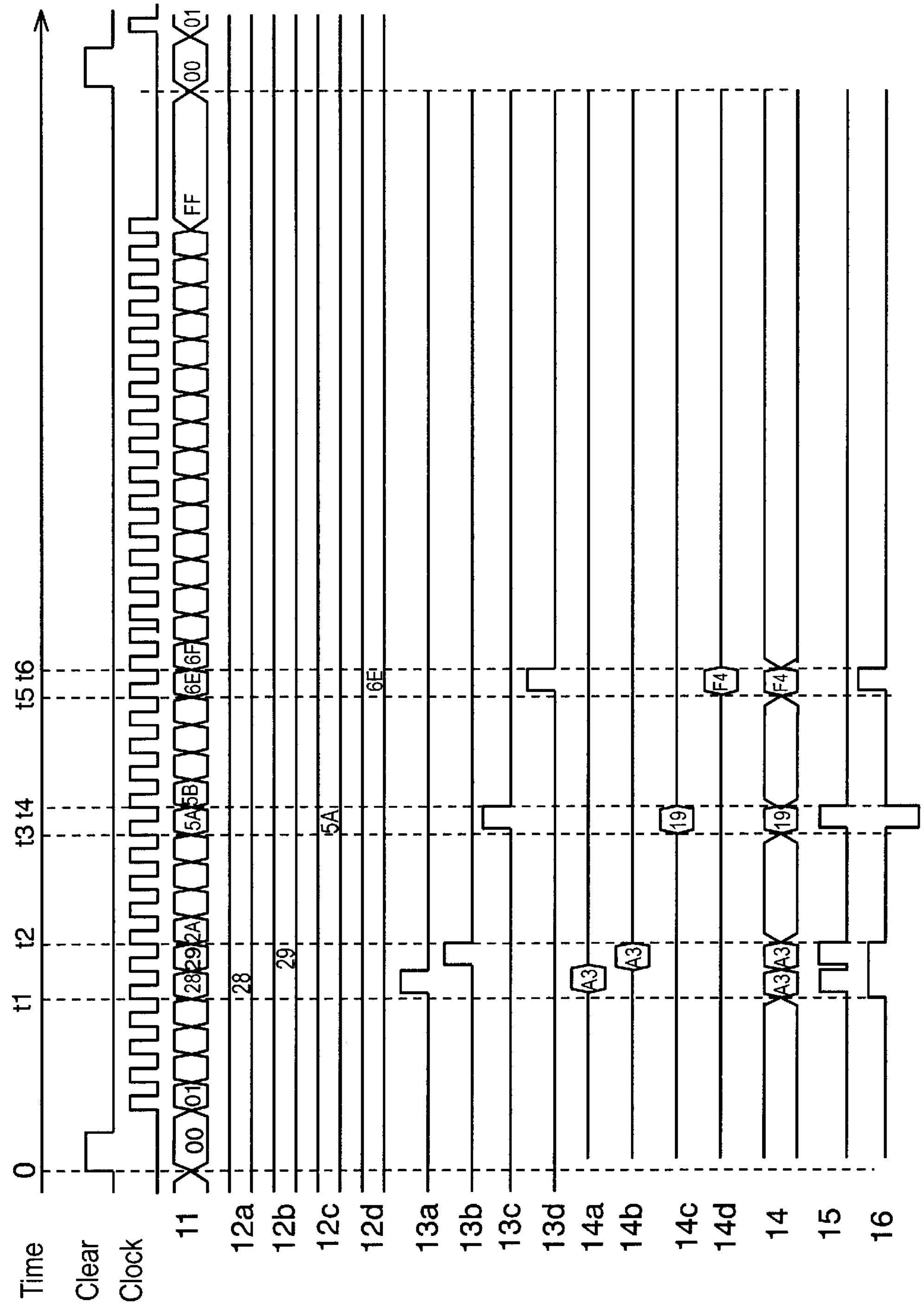
FIG. 19 is a timing chart showing an operation in epitome of the head drive unit of the third exemplary embodiment of this invention.

In FIG. 18 and FIG. 19, first, the CPU 41, which controls the system of ink-jet recorder, stores all of time data other than those when a value of the head driving current is "0", into the time data registers, as a part of the initializing operation prior to starting a printing operation, or a head driving operation. For instance, it stores a value "28" corresponding to time t1 into the time data register 2$a$, as time data 12$a$. When this is defined as (t1, 28, 12$a$)→2$a$, the others are defined in the same way as (t9, 29, 12$b$)→2$b$, (t3, 5A, 12$c$)→2$c$, (t5, 6E, 12$d$)→2$d$, (t7, 8C, 12$e$)→2$e$, (t10, 8D, 12$f$)→2$f$, and (t11, 8E, 12$g$)→2$g$.

In the same manner, the CPU 41 stores all of the electric current data other than those when a value of the head driving current is "0", into the current data registers. For instance, it stores a value "A3" at the time t1 into the current data register 4$a$, as electric current data 14$a$. When this is defined as (t1: A3, 14$a$)→4$a$, the others are defined in the same way as (t9: A3, 14$b$)→4$b$, (t3: 19 , 14$c$)→4$c$, (t5: F4, 14$d$)→4$d$, (t7: 42, 14$e$)→4$e$, (t10: 42, 14$f$)→4$f$, and (t11: 42, 14$g$)→4$g$.

In addition, the CPU 41 writes electric current data of a value "0" ("7F" in this instance) into the "0" current data register 6, and it completes the initializing operation.

Next, at the beginning of printing cycle, or when the time t=0, the count data 11 in the counter 1 is cleared. When the clear is lifted, and a clock serving as a timing reference for the head driving waveform is input thereafter, the counter 1 starts counting operation. At this point of time, all of the output signals 13$a$ through 13$g$ are "false", and the NOR logical output 15A is "true". Thus "0" current data 14$h$, i.e. "7F", is output from the "0" current data register 6.

When the time reaches t1, the count data 11 becomes "28" which is equal to the time data 12$a$, or the data "28" in the time data register 2$a$. This causes the comparator 3$a$ to turn its matching output signal 13$a$ into "true", and the current data 14$a$, or the data "A3", stored in the current data register 4$a$ is output. At the same time, the "0" current data register ceases its output because the NOR logical output 15A becomes "false". Accordingly, the current data 14$a$, or the data "A3", is input to the DAC 7.

When another clock subsequent to t1 is input, and the time becomes t9, the signal 13$b$ becomes "true", and the NOR logical output 15A becomes "false". Hence the current data 14$b$ is output from the current data register 4$b$.

When another clock subsequent to t9 is input, and the time becomes t2, the count data 11 becomes "2A". Since this is no longer equal to any of the time data in the registers 2, all of the signals 13$a$ through 13$g$ become "false", and the NOR logical output 15A becomes "true". As a result, "0" electric current data 14$h$ is output from the "0" current data register.

The above operations are repeated thereafter to generate head driving waveform for a complete printing cycle.

With the architecture as described above for generating the waveform with the data of current values other than those when value of the head driving current is "0", this exemplary embodiment only requires 7 Bytes for the time data and 8 Bytes for the electric current data, for a total of 15 Bytes, as compared to 256 Bytes needed by the conventional technique for storing and outputting the driving current waveform data for one printing cycle, in the case that the printing cycle is 128 microseconds and time resolution is 0.5 microsecond. When the temperature correction is carried out at 10 points, the reference data amount to a mere 150 Bytes, or approx. 1/17, in comparison to the 2560 Bytes needed by the prior technique.

Furthermore, it requires only 750 Bytes even if all the data for temperature correction are stored for the resolution of 1° C. within a range of 0 to 50° C. Therefore, all of the data can be stored as they are, without processing the data through calculation with the reference data using the method of linear interpolation and the like. In this case, the time to process the data becomes unnecessary, and transfer of the data is all that is required.

Figure 21A:
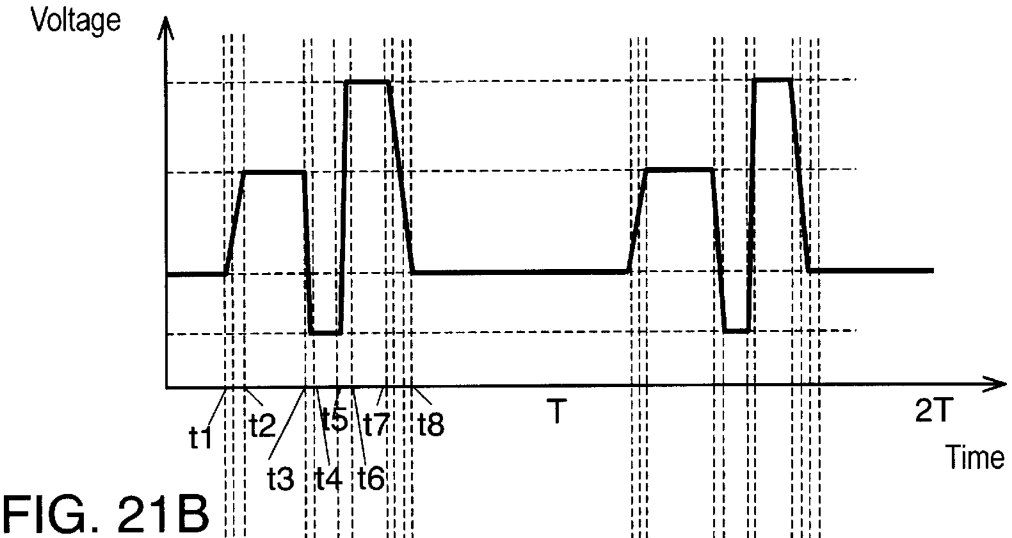
FIG. 21A is a diagrammatic illustration depicting an example of head driving wave as a voltage waveform.
Figure 21B:
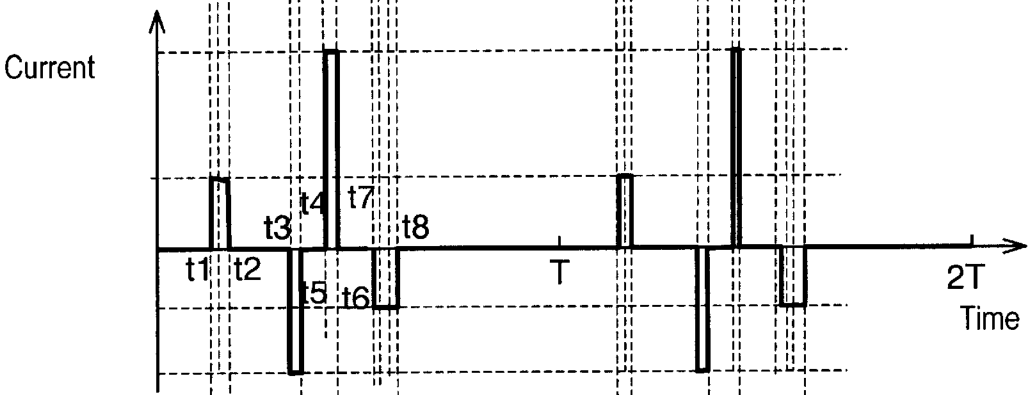
FIG. 21B is another diagrammatic illustration depicting the example of head driving wave as a current waveform.
Figure 21C:
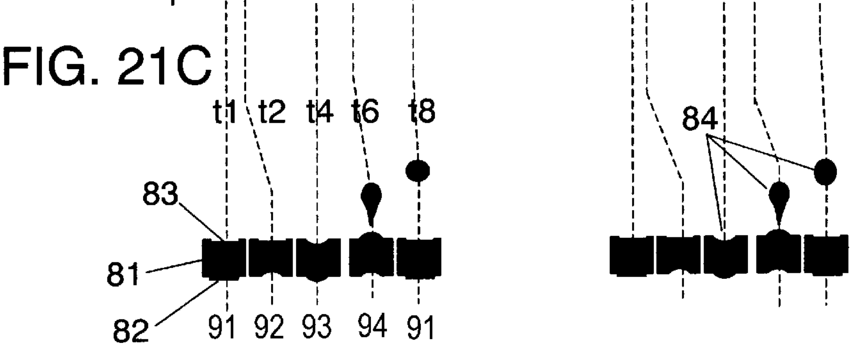
FIG. 21C is a diagrammatic illustration depicting changes of an actuator and a meniscus of a head, and appearance of ejected ink mist.

In the foregoing third exemplary embodiment, a time period in which the head driving current flows has been designed to be equivalent to two counts of the reference clock for the period between t1 and t2, and three counts of the reference clock for the period between t7 and t8 among four periods (t1 and t2, t3 and t4, t5 and t6, and t7 and t8), as shown in FIG. 21.

Due to the recent trends for speed-up of printing and improvement in image quality, i.e. speed-up and increased preciseness (high resolution) of head driving, there are often cases requiring a steep rise and steep fall for the head-driving waveform. In such cases, data length becomes 4 Bytes for time data and 5 Bytes for current data, for a total of 9 Bytes, when all domains where the head driving current flows are designed to be one count of the reference clock. This makes only about 1/28 of 256 Bytes as compared to the prior art technique.

In the third exemplary embodiment, what has been described is the device that normally outputs electric current data of "0" current value. However, when there is a need to supply the head actuator with a small charging current to cancel a variation in bias potential due to natural discharge, it can be dealt with by setting only a data for the necessary charge current with the "0" current data register 6.

In addition, the control logic can be simplified because of the architecture in that only one time data 12$a$ is stored in one time data register 2$a$, and provided with the comparator 3$a$ corresponding to it and the current data register 4$a$ for storing the electric current data 14$a$ corresponding to the time data 12$a$.

In the third exemplary embodiment, although what has been described is the case wherein there are 7 points in the head driving current, other than those of the "0" current value, the number of change points is not restrictive. Likewise, the data storing means are not limited to be the registers as has been described in the foregoing.

In addition, the output switching means consisting of the current data register 4, the NOR logic circuit 5 and the "0" current data register 6 can be replaced by any other means that accomplishes the function of storing and outputting the electric current data when it is compared with the comparator, and judged to satisfy the condition, as needless to mention.

According to the present invention as described above, a head driving waveform can be composed by storing only time data and the electric current data at points of change in electric current, without needing to store all the electric current data for the head driving waveform during a period of one printing cycle. Accordingly, amount of data and processing time for the head driving waveform can be reduced. Furthermore, the amount of data and the processing time can also be repressed from increasing even when the head driving waveform is modified to speedup or increase the resolution.

What is claimed is:

1. A head drive unit comprising:

an address counter for counting reference clocks;

time data storage means for storing a plurality of time data, each of said plurality of time data representing the time at a point when an electric current changes;

electric current data storage means for storing a plurality of electric current data corresponding to said plurality of time data respectively;

a plurality of comparators for comparing each of said plurality of time data with address count data of said address counter, each of said plurality of comparators outputs a matching signal when each of said plurality of time data matches with said address count data; and output means for storing and outputting, upon said matching signal is output, an electric current data corresponding to the time data compared by one of said comparators that outputs said matching signal, wherein the head drive unit drives a head based on the electric current data output by said output means.

2. The head drive unit according to claim 1, wherein said electric current data storage means and said time data storage means comprise registers.

3. The head drive unit according to claim 1, wherein the data stored in said electric current data storage means is a code representing an electric current data, and a data length of said code is shorter than a data length of said electric current data.

4. A head drive unit comprising:

an address counter for counting reference clocks;

time data storage means for storing a plurality of time data, each of said plurality of time data representing the time at a point when an electric current changes;

electric current data storage means for storing a plurality of electric current data corresponding to said plurality of time data respectively;

a time data selector for selecting any of said plurality of time data stored in aid time data storage means;

a current data selector for selecting any of said plurality of electric current data stored in said current data storage means;

a comparator for comparing the time data output by said time data selector with count data of said address counter, said comparator outputs a matching signal when the time data output by said time data selector matches with the count data;

a change point counter for counting said matching signal output by said comparator; and output means for storing and outputting, upon said matching signal is output, the electric current data selected by said current data selector, wherein said time data selector selects any of said plurality of time data according to the count data of said change point counter, said current data selector selects any of said plurality of electric current data according to the count data of said change point counter, and said head drive unit drives a head based on the electric current data output by said output means.

5. The head drive unit according to one of claims 4, wherein said electric current data storage means and said time data storage means comprise registers.

6. The head drive unit according to claim 4, wherein the data stored in said electric current data storage means is a code representing an electric current data, and a data length of said code is shorter than a data length of said electric current data.

7. A head drive unit comprising:

a counter for counting reference clocks;

a first electric current data storage means for storing a predetermined electric current data corresponding to a predetermined value of electric current;

a second electric current data storage means for storing a plurality of electric current data other than said predetermined electric current data;

time data storage means for storing a plurality of time data corresponding to said plurality of electric current data respectively;

a plurality of comparators for comparing each of said plurality of time data with count data of said counter, each of said plurality of comparators outputting a matching signal when each of said plurality of time data matches with said count data, and un-match signal when each of said plurality of time data does not match with said count data; and output means for storing and outputting, upon said matching signal is output, an electric current data corresponding to the time data compared by one of said comparators that outputs said matching signal, and for storing and outputting, upon said un-match signal is output, said predetermined electric current data stored in said first electric current data storage means, wherein said head drive unit drives a head based on the electric current data output by said output means.

8. The head drive unit according to claim 7, wherein value of electric current of said predetermined electric current data to be stored in said first electric current data storage means is zero.

9. The head drive unit according to claim 7, wherein said first electric current data storage means, said second electric current data storage means and said time data storage means comprise registers.

10. The head drive unit according to 7, wherein the data stored in said first electric current data storage means and is a code representing an electric current data, and a data length of said code is shorter than a data length of said electric current data.

11. A method of driving a head comprising the steps of:

(a) comparing a time for head driving operation with each of a plurality of time data at points where electric current change in a head driving waveform; and (b) outputting an electric current data corresponding to a time data in match with said time for head driving operation, among said plurality of time data, when said time for head driving operation matches with any of said plurality of time data, wherein said head is driven based on said electric current data output in said step (b).

12. The method of driving a head according to claim 11, wherein said electric current data is kept being output continuously when said time for head driving operation does not match with any of said plurality of time data in said step (b).

13. A method of driving a head comprising the steps of:

(a) comparing a time for head driving operation with each of a plurality of time data; and (b) outputting an electric current data corresponding to a time data in match with said time for head driving operation, among said plurality of time data, when said time for head driving operation becomes equal to any one of said plurality of time data, and outputting an electric current data of a predetermined value when said time for head driving operation is not equal to any of said plurality of time data, wherein said head is driven based on said electric current data output in said step (b).

14. The method of driving a head according to claim 13, wherein said predetermined value of said head driving current is zero.

* * * * *

UNITED STATES PATENT AND TRADEMARK OFFICE

CERTIFICATE OF CORRECTION

PATENT NO. : 6,513,893 B2 
DATED : February 4, 2003
INVENTOR(S) : Takahiro Esaki et al.

It is certified that error appears in the above-identified patent and that said Letters Patent is hereby corrected as shown below:

Column 13,
Line 44, replace "aid" with -- said --.

Signed and Sealed this

Second Day of September, 2003

JAMES E. ROGAN
*Director of the United States Patent and Trademark Office*

UNITED STATES PATENT AND TRADEMARK OFFICE

CERTIFICATE OF CORRECTION

PATENT NO. : 6,513,893 B2 
DATED : February 4, 2003
INVENTOR(S) : Takahiro Esaki et al.

It is certified that error appears in the above-identified patent and that said Letters Patent is hereby corrected as shown below:

Title page,
Item [73], Assignee, change "Matsushita Electrc Industrial Co., Ltd., Kadoma (JP)" to -- Matsushita Electric Industrial Co., Ltd., Kadoma (JP) --.

Signed and Sealed this

Twenty-fourth Day of February, 2004

JON W. DUDAS
*Acting Director of the United States Patent and Trademark Office*